United States Patent [19]
Fukui

[11] Patent Number: 5,495,152
[45] Date of Patent: Feb. 27, 1996

[54] FREQUENCY SIGNAL CONTROL CIRCUIT AND VIBRATION TYPE MOTOR APPARATUS USING SAME

[75] Inventor: Hajime Fukui, Tokyo, Japan

[73] Assignee: Canon Kabushiki Kaisha, Tokyo, Japan

[21] Appl. No.: 30,890

[22] Filed: Mar. 12, 1993

[30] Foreign Application Priority Data

Mar. 13, 1992 [JP] Japan .................................. 4-055583

[51] Int. Cl.$^6$ .............................. H02P 7/00; H01L 41/08
[52] U.S. Cl. ........................ 318/116; 310/319; 310/316
[58] Field of Search .................................. 318/114, 118, 318/116, 445, 460, 446, 655; 310/316, 317, 319, 323, 328

[56] References Cited

U.S. PATENT DOCUMENTS

| | | |
|---|---|---|
| 4,812,699 | 3/1989 | Ogawa et al. ......................... 310/316 |
| 4,853,578 | 8/1989 | Takahashi et al. ...................... 310/315 |
| 4,965,481 | 10/1990 | Kashiyama ............................ 310/316 |
| 5,061,882 | 10/1991 | Takagi ................................. 318/116 |
| 5,099,180 | 3/1992 | Noguchi .............................. 318/116 |
| 5,130,619 | 7/1992 | Izuno ................................. 318/116 |
| 5,146,143 | 9/1992 | Furutsu .............................. 318/116 |
| 5,159,253 | 10/1992 | Shimizu et al. .................... 318/114 X |
| 5,165,047 | 11/1992 | Shimizu .............................. 318/116 |
| 5,376,855 | 12/1994 | Suganuma ............................ 310/316 |

*Primary Examiner*—Jonathan Wysocki
*Attorney, Agent, or Firm*—Fitzpatrick, Cella, Harper & Scinto

[57] ABSTRACT

A frequency signal control circuit for a vibration type motor apparatus, which uses as a driving force a vibration generated by application of a frequency signal to an electromechanical energy conversion element thereof, inhibits a shift operation of the frequency signal to a lower frequency when a detector detects that a voltage level of a power supply is less than or equal to a predetermined first level, and shifts the frequency to a higher frequency when the detector detects that the voltage level is less than or equal to a second level, the second level being lower than the first level.

13 Claims, 22 Drawing Sheets

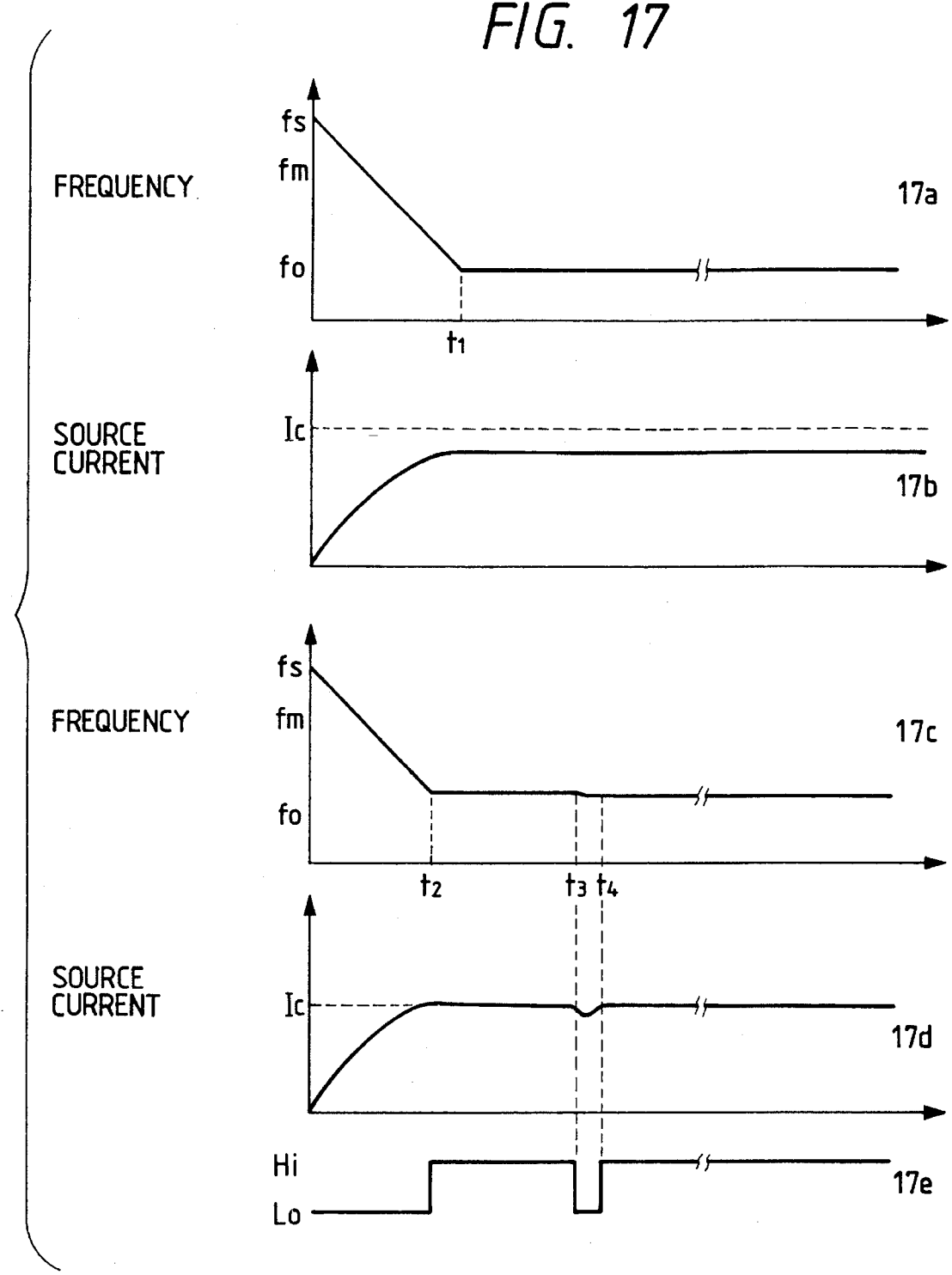

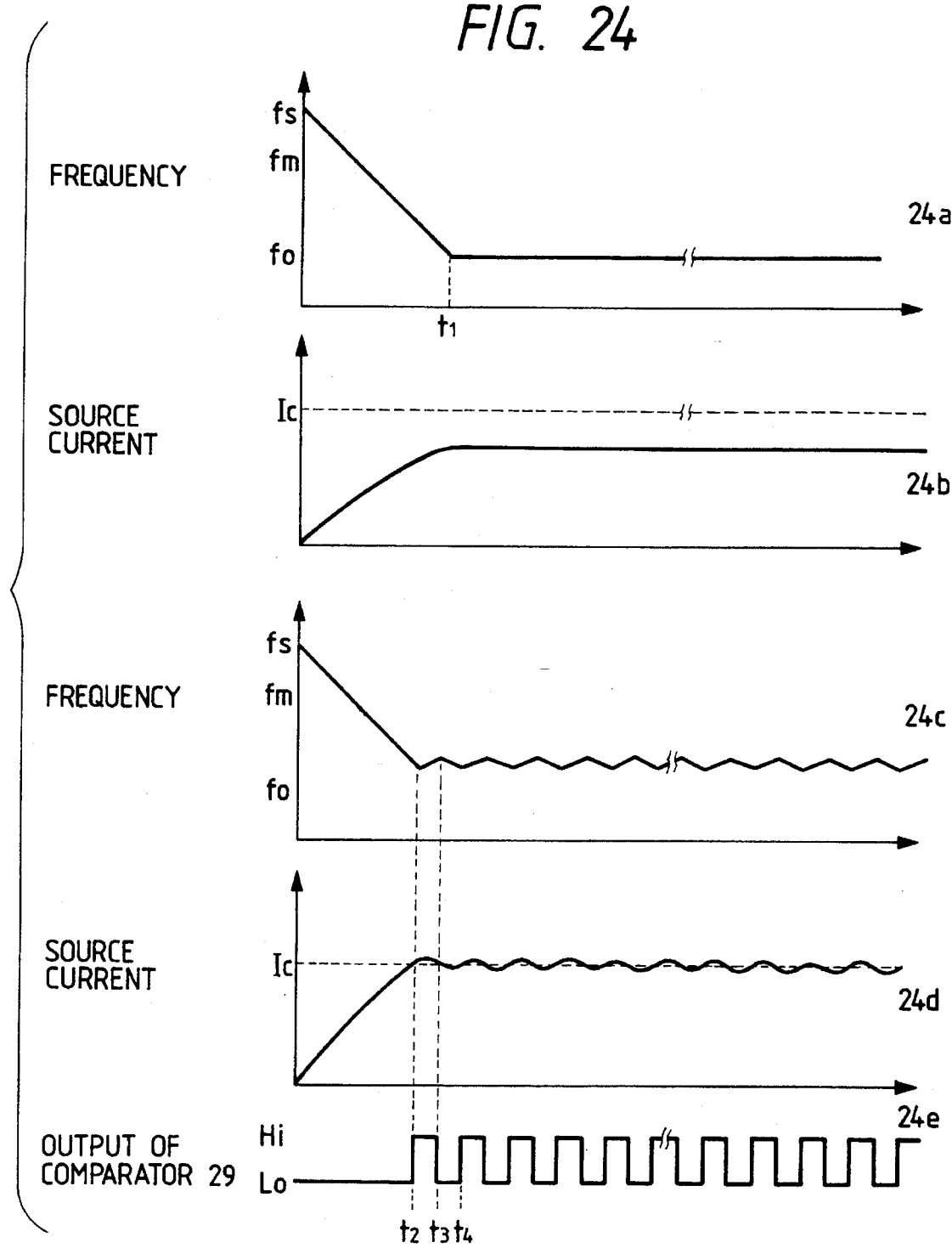

FREQUENCY SIGNAL CONTROL CIRCUIT AND VIBRATION TYPE MOTOR APPARATUS USING SAME

BACKGROUND OF THE INVENTION

1. Field of the Invention

The present invention relates to a driving control apparatus for a vibration wave motor (vibration type driving apparatus or motor).

2. Related Background Art

A known vibration wave motor (vibration type driving apparatus or motor) has the following characteristics. When the frequency of a driving voltage is decreased below a specific frequency, the rotational speed of the motor is abruptly decreased, and the motor is stopped.

In order to prevent this, a driving control apparatus for the vibration wave motor performs the following control operations: (a) a phase difference between an output signal from a so-called sensor-electrode and the driving voltage of the vibration wave motor is monitored so as to detect a vibration state of a vibrator of the vibration wave motor, and the frequency of the driving voltage of the vibration wave motor is controlled so as not to be that specific frequency in accordance with this phase difference; (b) the amplitude of an output signal from the sensor-electrode is detected, and the frequency of the driving voltage is controlled so as not to be the specific frequency or less in accordance with the detection result; and the like.

In addition, a high voltage is required to drive a vibration wave motor, (i) the driving voltage applied to the vibration wave motor must be boosted by a transformer, and the boosted voltage must be applied to the motor, (ii) a battery voltage must be boosted by a DC/DC converter or the like to a voltage required for driving the vibration wave motor, or (iii) a high-voltage battery must be used. A power supply unit in accordance with method (ii) is used in a conventional vibration wave motor driving control apparatus.

In the conventional driving control apparatus using a power supply unit according to method (ii), a large, expensive DC/DC converter is required to prevent an abrupt rotation stop phenomenon of the vibration wave motor. In addition, the capacity of a battery for applying an input voltage to the DC/DC converter must also be large. To prevent the rotation stop phenomenon of the vibration wave motor, the battery must be replaced with a new one long before the end of its service life, resulting in an economical disadvantage in efficient battery utilization. In addition, the running cost of a device incorporating a vibration wave motor is increased, and the weight and size of the device are undesirably increased.

SUMMARY OF THE INVENTION

An object of the present invention is to provide a vibration wave motor driving control apparatus in which a power supply unit including a battery and a DC/DC converter can be smaller in size, lighter in weight, and less expensive than a conventional power supply unit, and an abrupt rotation stop phenomenon can be eliminated from a vibration wave motor.

One aspect of the present invention, based on the above object, is to provide a vibration type motor, wherein when the voltage level of a power supply unit is determined to be lower than a predetermined level (first level), any shift of the frequency of a driving signal for the motor to a lower frequency is inhibited, and when the voltage level of the power supply unit is lower than a second level, lower than the first level, the frequency is shifted to a higher frequency.

Another aspect of the present invention, based on the above object, is to provide a motor apparatus wherein a battery current value is detected or a voltage is converted into a digital value by an A/D converter to determine the voltage level.

The above and other objects, features, and advantages of the present invention will be apparent from the detailed description of preferred embodiments in conjunction with the accompanying drawings.

BRIEF DESCRIPTION OF THE DRAWINGS

FIGS. 17a to 17e are timing charts for explaining an operation of the apparatus shown in FIG. 15;

FIGS. 24a to 24e are timing charts for explaining an operation of the apparatus shown in FIG. 22.

DETAILED DESCRIPTION OF THE PREFERRED EMBODIMENTS

First Embodiment

Figure 1:
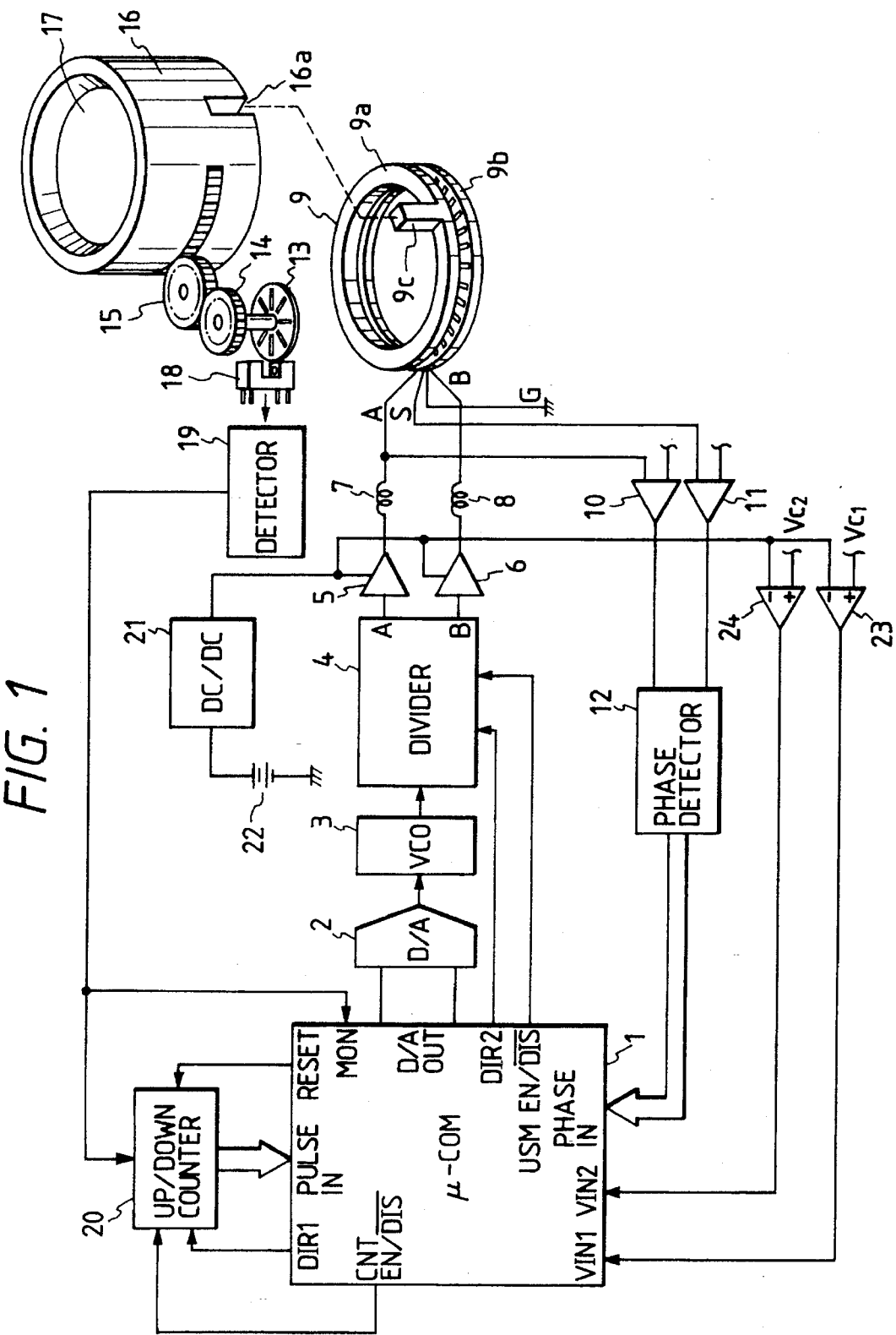
FIG. 1 is a schematic view showing an arrangement of an apparatus according to the first embodiment of the present invention.

FIG. 1 is a schematic view showing an arrangement of an apparatus according to the first embodiment of the present invention. This apparatus includes a microcomputer 1.

A D/A converter 2 converts a digital output signal from the microcomputer 1 into an analog voltage.

A voltage-controlled oscillator (VCO) 3 generates a frequency voltage corresponding to the output voltage from the D/A converter 2.

A divider 4 frequency-divides a frequency voltage from the VCO 3 and outputs a frequency voltage having a phase difference of $\pm 1/2\pi$.

Power amplifiers 5 and 6 amplify an output voltage from the divider 4 into a voltage and a current value which can drive a vibration wave motor 9.

The apparatus also includes matching coils 7 and 8. The vibration wave motor (vibration type driving apparatus or motor) 9 has a rotor 9a and a stator 9b. A key 9c transmits the rotational force to a lens barrel 16. The apparatus further includes voltage comparators 10 and 11.

A phase detector 12 detects the phase difference between an output voltage of the sensor electrode and the driving voltage of the vibration wave motor, and outputs the detected phase difference as digital signals to the microcomputer 1.

A pulse plate 13 is interlocked with the peripheral gear portion of the lens barrel 16 through gears 14 and 15.

A lens 17 is mounted in the lens barrel 16, and a photointerrupter 18 detects rotation of the pulse plate 13, i.e., the rotational speed of the vibration wave motor 9. A signal detector 19 detects a signal from the photointerrupter 18. The detector 19 amplifies a small signal from the photointerrupter and converts it into a digital signal.

An up/down counter 20 counts pulses generated upon rotation of the pulse plate 13.

A DC/DC converter 21 converts a voltage applied from a battery 22 into a voltage required to drive the vibration wave motor. Voltage detectors (comparators) 23 and 24 output signals of Lo (low) level when the output voltage from the DC/DC converter 21 is higher than a predetermined voltage. The voltage detectors 23 and 24 output signals of Hi (high) level when the output voltage from the DC/DC converter 21 is lower than the predetermined voltage.

The functions of the respective terminals of the microcomputer 1 will be described below.

An input terminal VIN1 receives a determination result from the voltage detector 23.

An input terminal VIN2 receives a determination result from the voltage detector 24.

An input terminal PHASE IN receives a detection phase value from the phase detector 12.

An output terminal USM EN/DIS performs enable/disable setup for driving the vibration wave motor 9.

An output terminal DIR2 sets the rotational direction of the vibration wave motor 9.

An output terminal D/A OUT is connected to the D/A converter 2.

A direct input terminal MON is connected to the detector 19.

An output terminal RESET resets the up/down counter 20 when the output terminal RESET is set at Hi level.

An input terminal PULSE IN receives a count value from the up/down counter 20.

An output terminal DIR1 sets the counting direction of the up/down counter 20. When the output terminal DIR1 is set at Hi level, a count-up operation of the up/down counter 20 is performed. However, when the output terminal DIR1 is set at Lo level, a count-down operation is performed.

An output terminal CNT EN/DIS enables/disables counting of the up/down counter 20. When the output terminal CNT EN/DIS is set at Hi level, counting of the up/down counter 20 is enabled. When the output terminal CNT EN/DIS is set at Lo level, counting of the up/down counter 20 is disabled.

Figure 2:
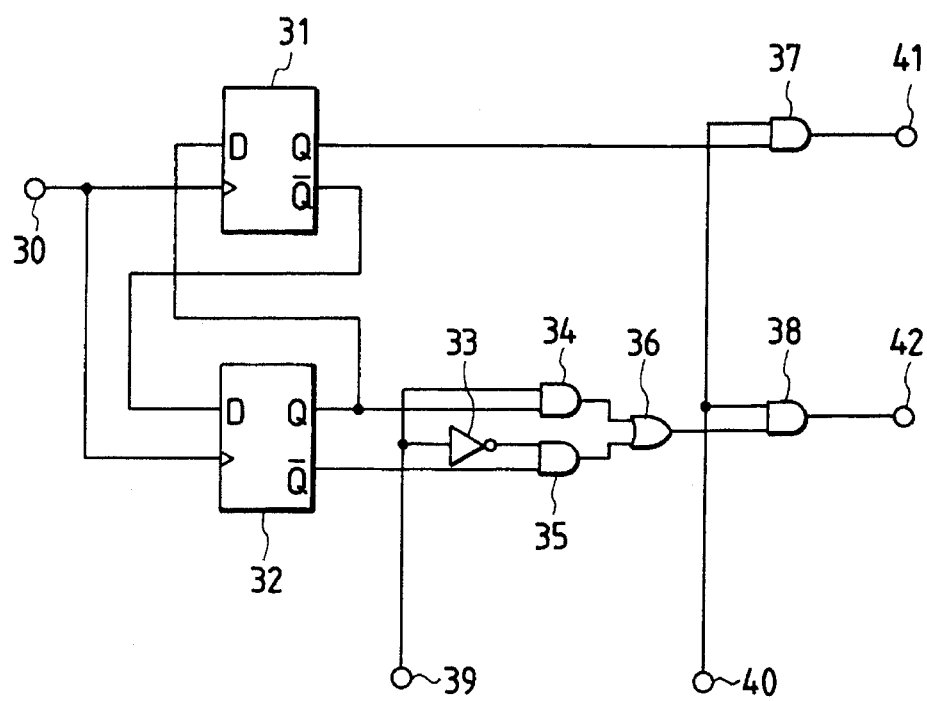
FIG. 2 is a circuit diagram showing a detailed arrangement of a divider shown in FIG. 1.

FIG. 2 shows a detailed arrangement of the divider 4 shown in FIG. 1. Referring to FIG. 2, the divider 4 includes D flip-flops 31 and 32, a NAND gate 33, AND gates 34, 35, 37, and 38, and an OR gate 36.

An input terminal 30 receives a four-time frequency output from the VCO 3. A driving direction setup terminal 39 sets the rotational direction of the vibration wave motor. A driving enable/disable terminal 40 enables driving of the vibration wave motor when the terminal 40 is set at Hi level. When the terminal 40 is set at Lo level, driving of the vibration wave motor is disabled.

Figure 3:
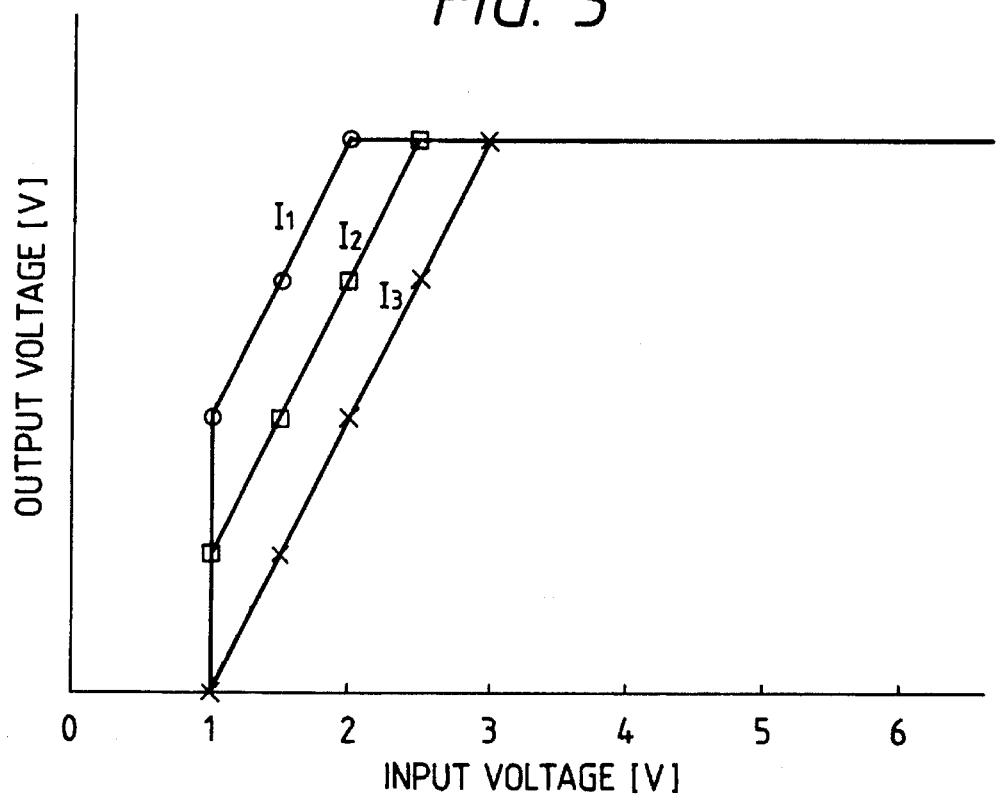
FIG. 3 is a graph showing characteristics of a DC/DC converter shown in FIG. 1.

FIG. 3 is a graph showing the input voltage output voltage characteristics of the DC/DC converter shown in FIG. 1. More specifically, these input voltage vs. output voltage characteristics are obtained for output currents $I_1$, $I_2$, and $I_3$ ($I_1 < I_2 < I_3$). In the region where the input voltage is smaller than a predetermined level, the output voltage cannot be maintained and is decreased.

The vibration wave motor (vibration type motor) will be described with reference to FIG. 4.

Figure 4:
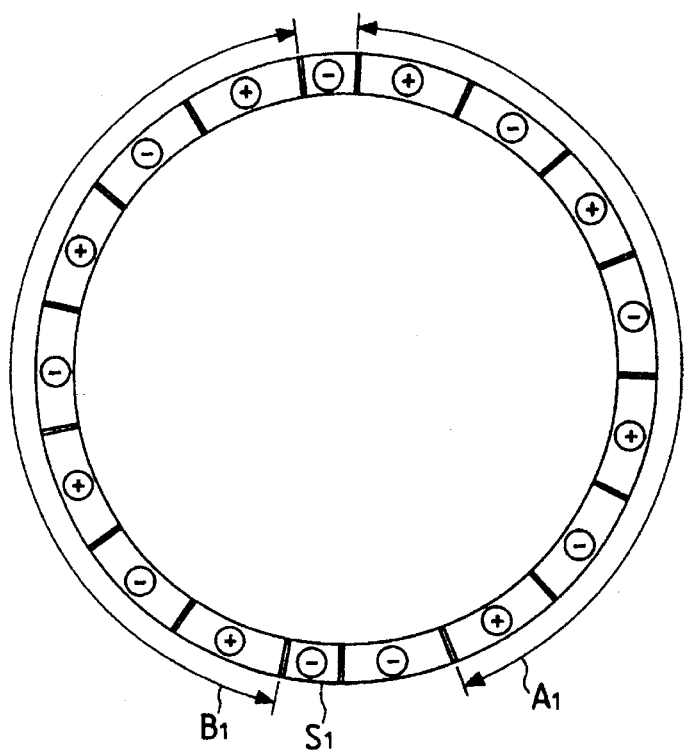
FIG. 4 is a view showing polarization of a vibration wave motor.

FIG. 4 is a view for explaining the layout of electrostrictive elements arranged on the lower surface of the stator 9b. Note that electro-mechanical energy conversion elements such as piezoelectric elements may be used in place of the electrostrictive elements. First and second electrostrictive element groups A1 and B1 are arranged on the stator 9b in accordance with the illustrated phase and polarization relationships. A sensor electrostrictive element S1 is arranged at a position phase-shifted from the first electrostrictive element group B1 by 45°. Independent electrostrictive elements may be mounted on a vibrator, or the electrostrictive elements may be formed by simultaneous polarization.

Driving electrodes A and B in FIG. 1 are arranged for the first and second electrostrictive element groups, respectively. A frequency voltage obtained through the amplifier 5 is applied to the electrode A, and a frequency voltage obtained through the amplifier 6 is applied to the electrode B to generate a traveling vibration wave (vibration).

A sensor electrode S in FIG. 1 is arranged for the sensor electrostrictive element S1. When the vibration wave is formed on the surface of the stator 9b, the sensor electrode S outputs a frequency voltage in accordance with the vibrating state of this vibration wave. The output frequency voltage is detected by the sensor electrode S1. In the resonance state, the vibration wave motor has characteristics representing a specific phase relationship between the driving voltage applied to the A electrode and the output voltage from the sensor electrode. This specific phase relationship is determined by the positional relationship between the first electrostrictive element A1 applied with the frequency signal from the electrode A and the sensor electrostrictive element S. In this embodiment, in the forward rotation state, the resonance state is obtained when the signal waveforms at the electrodes A and S have a phase difference of 135°. In the reverse rotation state (phase difference between signals from electrodes A and S changes 45°), when the phase difference is shifted from that in the resonance state, the phase difference relationship is shifted accordingly.

Figure 5:
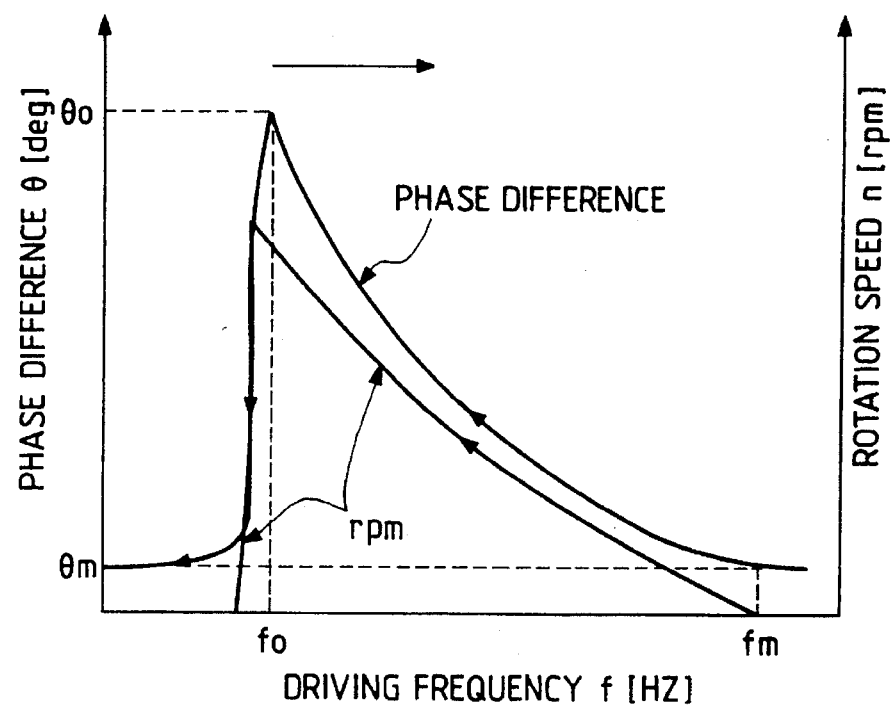
FIG. 5 is a graph illustrating characteristics showing the phase and rotational speed of the vibration wave motor.

FIG. 5 is a graph showing the phase characteristics of the vibration wave motor 9. The driving frequency f is plotted along the abscissa, and a phase difference between the A- and S-electrodes and a rotation speed n are plotted along the ordinate. Referring to FIG. 5, the phase difference Θ comes closer to the phase difference of the resonance state when the phase difference Θ is decreased in the upward direction. The rotational speed n is increased upward, and the frequency f is increased to the right.

When the driving frequency is shifted from a high frequency to a low frequency, the vibration wave motor is operated from a start frequency fm. As the drive frequency is lowered, the rotational speed is increased, and at the same time the phase difference Θ between the A- and S-electrodes is decreased. However, when the frequency is further decreased below the resonance frequency fo, rotation of the motor is abruptly stopped, and the phase difference Θ also varies. This characteristic curve is shifted depending on the temperature and load. In particular, when the load is increased, the characteristic curve is shifted in the right direction in FIG. 5.

Figure 6:
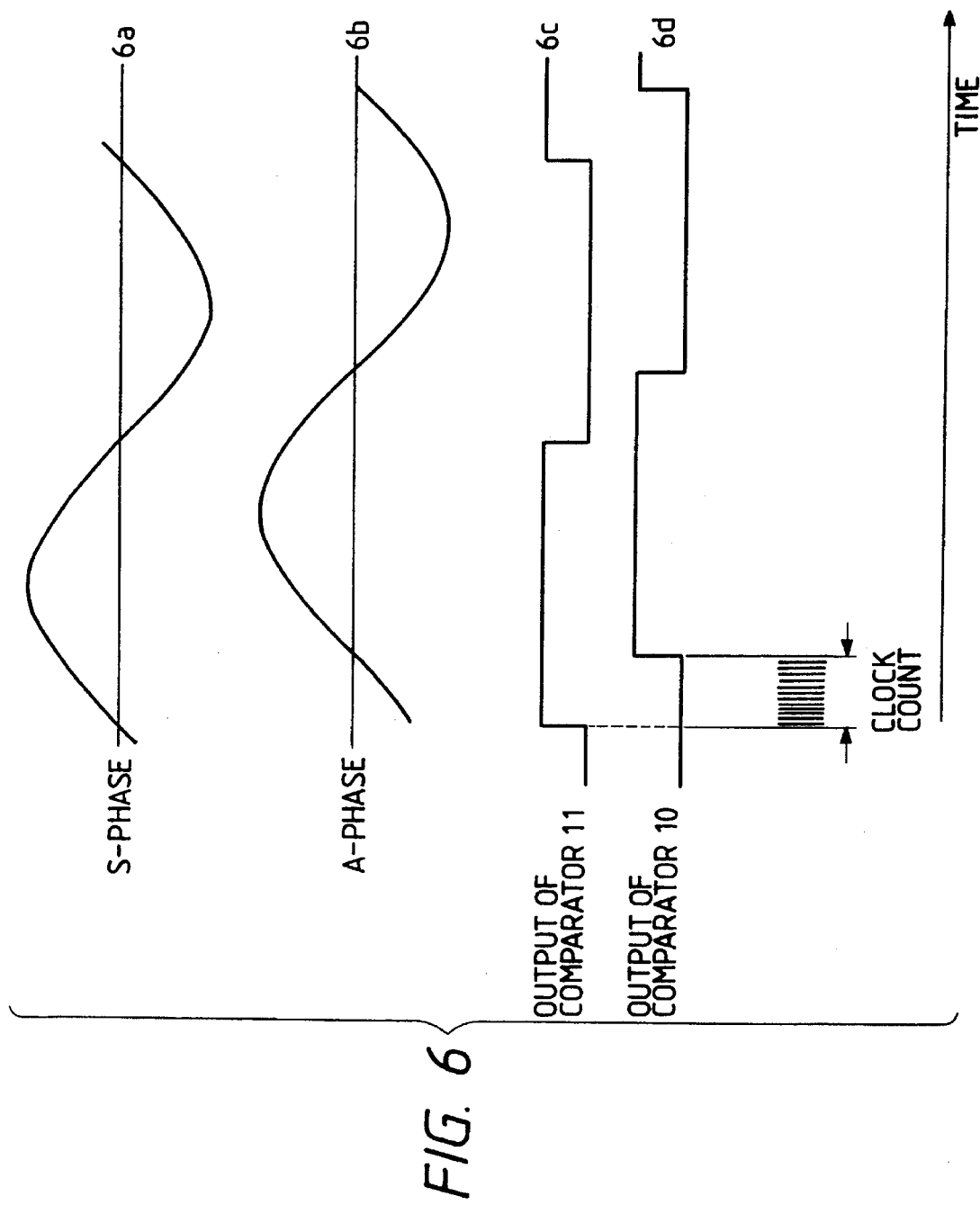
FIG. 6 is a view showing an operation of a phase detector.

FIG. 6 is a view showing the concept of phase detection between the A- and S-electrodes. An S-electrode voltage waveform 6a, an A-phase voltage 6b, and waveforms 6c and 6d obtained by converting the A- and S-electrode voltage waveforms 6a and 6b into digital signals through the comparators 10 and 11 are illustrated from the top in FIG. 6.

In the phase detector 12 shown in FIG. 1, for example, a time interval from a timing when the output from the comparator 11 is set at Hi level to a timing when the output from the comparator 10 is set at Hi level is measured by counting reference clock pulses by a counter, thereby directly measuring the phases between the A- and S-electrodes in the form of digital values.

For example, by counting a reference clock having a frequency which is 256 times the driving frequency, the phase difference between the A- and S-electrodes can be measured every 1.4° (=360°/256). The microcomputer 1 can directly read it as 8-bit data with a precision of 1.4° (=1 LSB).

Figure 7:
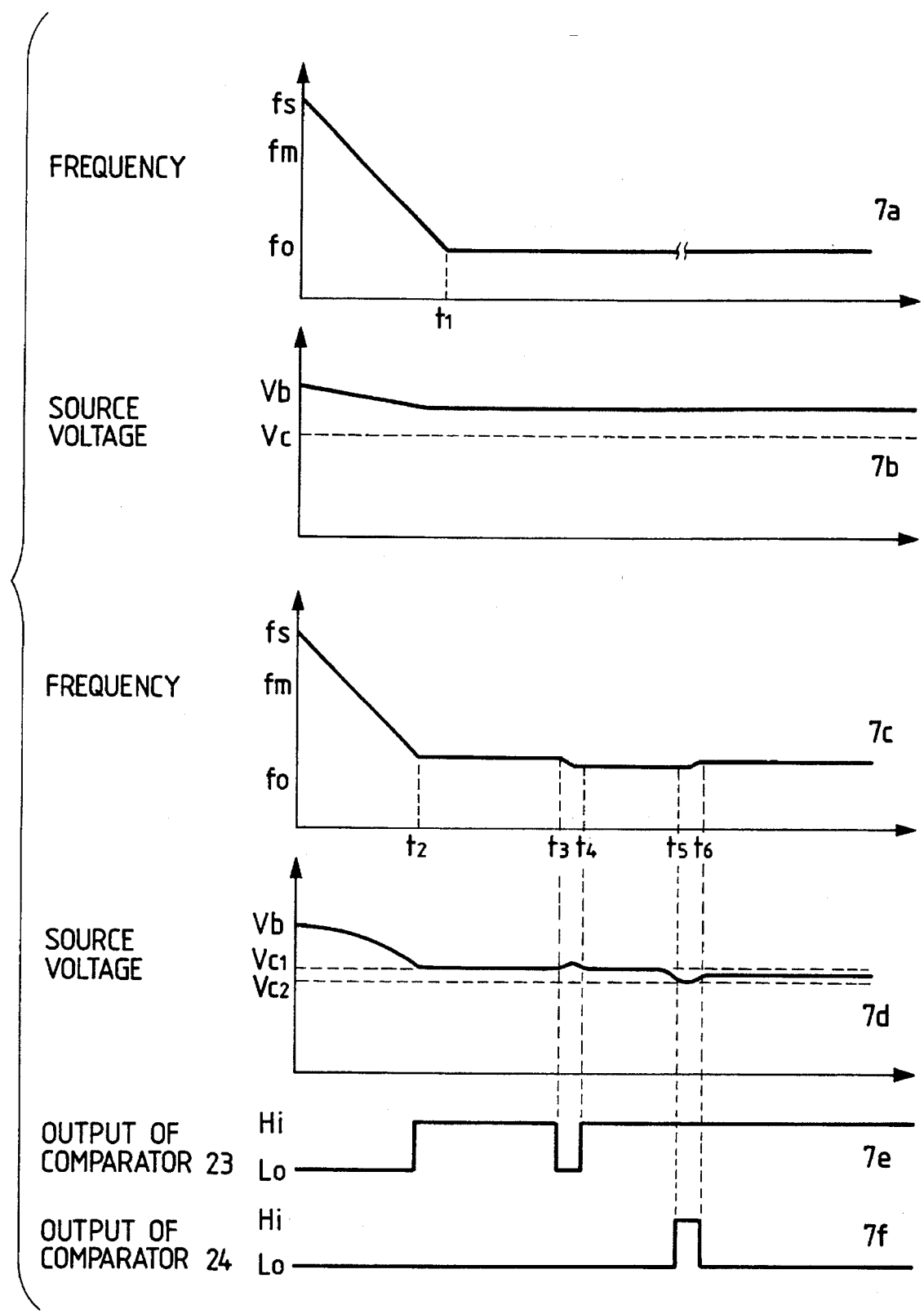
FIGS. 7a to 7f are timing charts showing an operation of the apparatus shown in FIG. 1.

The operation of this embodiment will be described below with reference to FIGS. 7a to 7f. The time is plotted along the abscissa in FIG. 7f. The frequency f is plotted along the ordinate in each of FIGS. 7a and 7c and is increased upward. The secondary voltage of the DC/DC converter 21 is plotted along the ordinate in each of FIGS. 7b and 7d and is increased upward. FIG. 7e represents an output from a secondary voltage decrease detection voltage comparator. This output represents the Hi or Lo level of the digital signal.

FIGS. 7a and 7b show cases in which the voltage of the battery 22 which is applied to the DC/DC converter 21 is sufficiently high and a decrease in secondary voltage of the DC/DC converter does not occur. Referring to FIG. 7a, the driving frequency of the vibration wave motor is controlled by the microcomputer 1, and the frequency is scanned from the vibration wave motor start frequency fm to the lower direction. On the other hand, when an interval between the pulses generated upon rotation of the pulse plate 13 reaches a target interval or a phase difference between the A- and S-electrode driving signals of the vibration wave motor 9 which are detected by the phase detector 12 reaches a given value at time t1, the microcomputer stops scanning the frequency.

FIGS. 7c to 7f show cases in which the voltage of the battery 22 which is applied to the DC/DC converter 21 is decreased, and the secondary voltage from the DC/DC converter 21 is decreased in accordance with the load. Referring to FIG. 7c, the driving frequency of the vibration wave motor is scanned by the microcomputer 1 in the same manner as in FIG. 7a. Before the interval between the pulses reaches the target interval or the phase reaches the predetermined value, the secondary voltage from the DC/DC converter 21 is decreased, as shown in FIG. 7d. When the voltage reaches a predetermined comparison voltage Vc1 at time t2, an output from the comparator 23 goes from Lo level to Hi level. This change is detected by the microcomputer 1, and scanning of the frequency is stopped. Thereafter, the output voltage from the DC/DC converter 21 is restored due to a decrease in load or the like and is higher than the Vc1 level, and the output from the comparator 23 goes from Hi level to Lo level at time t3. The frequency is scanned again to be a lower frequency by the microcomputer 1. The output from the DC/DC converter is decreased again and is lower than Vol at time t4, the comparator 23 goes from Lo level to Hi level. In this state, the microcomputer 1 stops scanning the frequency.

An output voltage from the DC/DC converter 21 is decreased due to an increase in load or the like and is lower than the Vc2 level at time t5, the output from the comparator 24 goes from Lo level to Hi level. The microcomputer 1 shifts the frequency to a higher frequency by a predetermined amount. The output from the DC/DC converter is restored accordingly. When this output is higher than Vc2 at time t6, the comparator 24 goes from Hi level to Lo level again, and the microcomputer stops scanning the frequency.

A control operation programmed in the microcomputer 1 will be described with reference to FIG. 8. [Step 801] The terminal RESET of the microcomputer 1 is set at Lo level for a predetermined period of time to initialize the up/down counter 20. The terminal DIR1 of the microcomputer 1 is set at Hi level to perform a count-up operation if the driving direction of the vibration wave motor is CCW (counterclockwise direction). However, if the driving direction of the vibration wave motor is CW (clockwise direction), then the terminal DIR1 of the microcomputer 1 is set at Lo level. Subsequently, the terminal CNT EN/$\overline{\text{DIS}}$ is set at Hi level to enable counting of the up/down counter 20.

[Step 802] If the driving direction of the vibration wave motor is CCW, then the terminal DIR2 of the microcomputer 1 is set at Hi level. However, if the driving direction is CW, then the terminal DIR2 is set at Lo level.

[Step 803] The terminal D/A OUT of the microcomputer 1 is set to have a value corresponding to the initial frequency fs.

[Step 804] The terminal USM EN/$\overline{\text{DIS}}$ of the microcomputer 1 is set at Hi level to start driving the vibration wave motor.

[Step 805] If an output from the comparator 24 is set at Lo level, then an output from the DC/DC converter 21 has the comparison level or more, and the flow branches into steps 807. However, if the output from the comparator 24 is set at Hi level, then the output from the DC/DC converter 21 is lower than the comparison level. The flow then branches into step 806.

[Step 806] The frequency is increased by a predetermined value to decelerate the vibration wave motor, and the flow Jumps to step 811.

[Step 807] If the phase difference between the A- and S-electrodes detected by the phase detector 12 is smaller than a predetermined value (i.e., a value representing a phase difference near the resonance state), then the flow branches into step 811 to accelerate the vibration wave motor. However, if the phase difference between the A- and S-electrodes is the predetermined value or more, then the flow branches to step 808 since the vibration wave motor can be further accelerated.

[Step 808] The interval between pulses generated upon rotation of the pulse plate 13 is measured. If the pulse width is smaller than a predetermined value, then the flow branches into step 811 to stop the acceleration. However, if the pulse width is the predetermined value or more, then the flow branches into step 809 to accelerate the vibration wave motor to a target speed. Note that the pulse width is detected on the basis of a pulse input to the input terminal MON.

[Step 809] If an output from the comparator 23 is set at Lo level, then an output from the DC/DC converter 21 is the comparison level or more, and the flow branches into step 810 to further accelerate the vibration wave motor. However, if the output from the comparator 23 is set at Hi level, and the output from the DC/DC converter 21 is less than the comparison level, then the flow branches into step 811 to stop the acceleration.

[Step 810] The frequency is decreased by a predetermined value to accelerate the vibration wave motor.

[Step 811] The count value of the up/down counter 20 is retrieved from the input terminal PULSE IN of the microcomputer 1. If the driving position does not reach a target driving position, then the flow returns to step 805. Otherwise, the flow branches into step 812.

[Step 812] The terminal USM EN/$\overline{\text{DIS}}$ of the microcomputer 1 is set at Lo level to stop driving the vibration wave motor.

Second Embodiment

Figure 9:
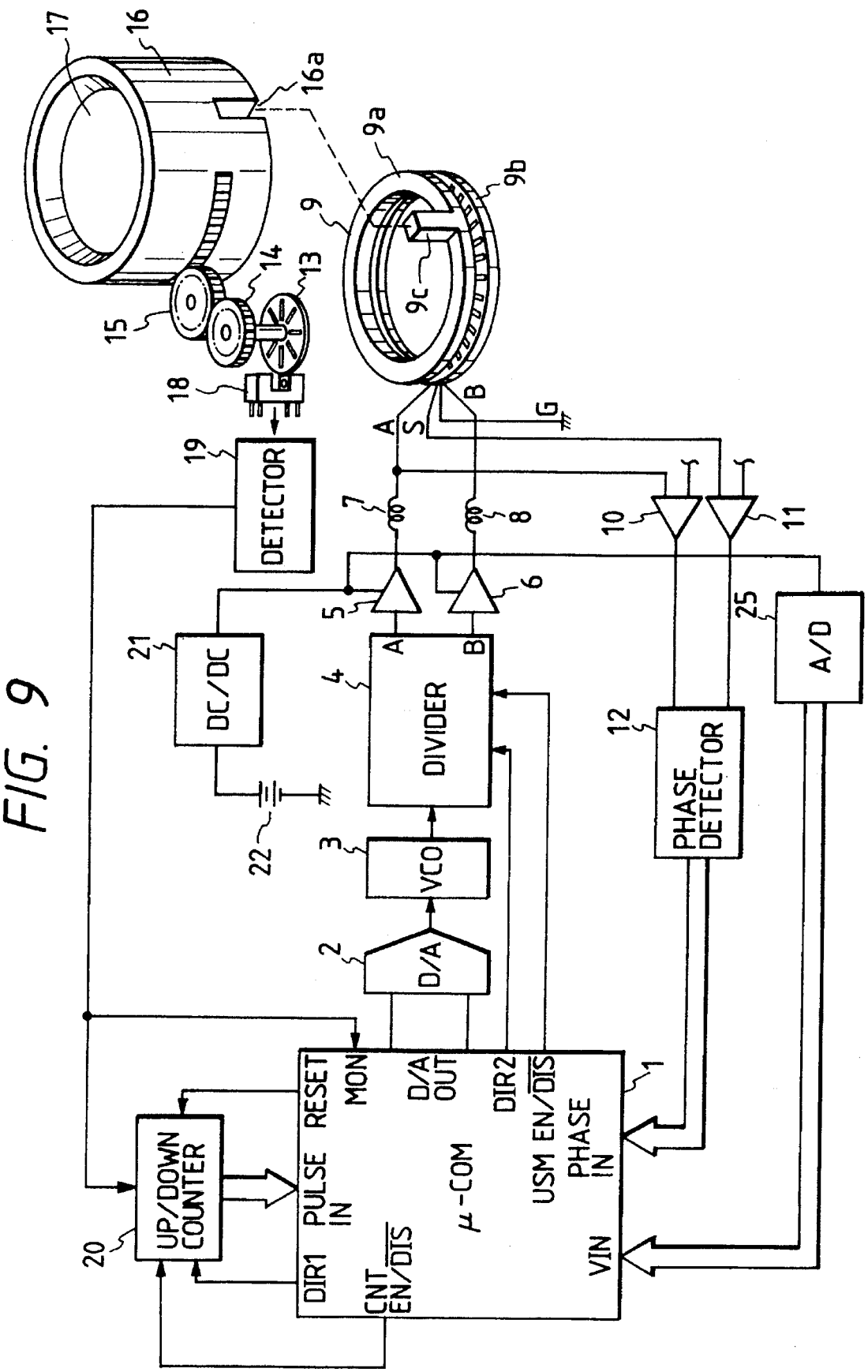
FIG. 9 is a schematic view showing an arrangement of an apparatus according to the second embodiment of the present invention.

FIG. 9 is a view showing the second embodiment of the present invention. The same reference numerals as in FIG. 1 denote the same parts, and a detailed description thereof will be omitted. An A/D converter 25 serves as a voltage detector. The A/D converter 225 converts an analog output voltage from a DC/DC converter 21 into a digital signal, so that the output voltage from the DC/DC converter 21 can be fed to a microcomputer 1.

An operation of the second embodiment will be described with reference to FIGS. 10a to 10d. Time is plotted along the abscissa in each of FIGS. 10a to 10d. A frequency f is plotted along the ordinate of each of FIGS. 10a and 10c and is increased upward. The secondary voltage of the DC/DC converter 21 is plotted along the ordinate of each of FIGS. 10b and 10d and is increased upward.

Figure 10:
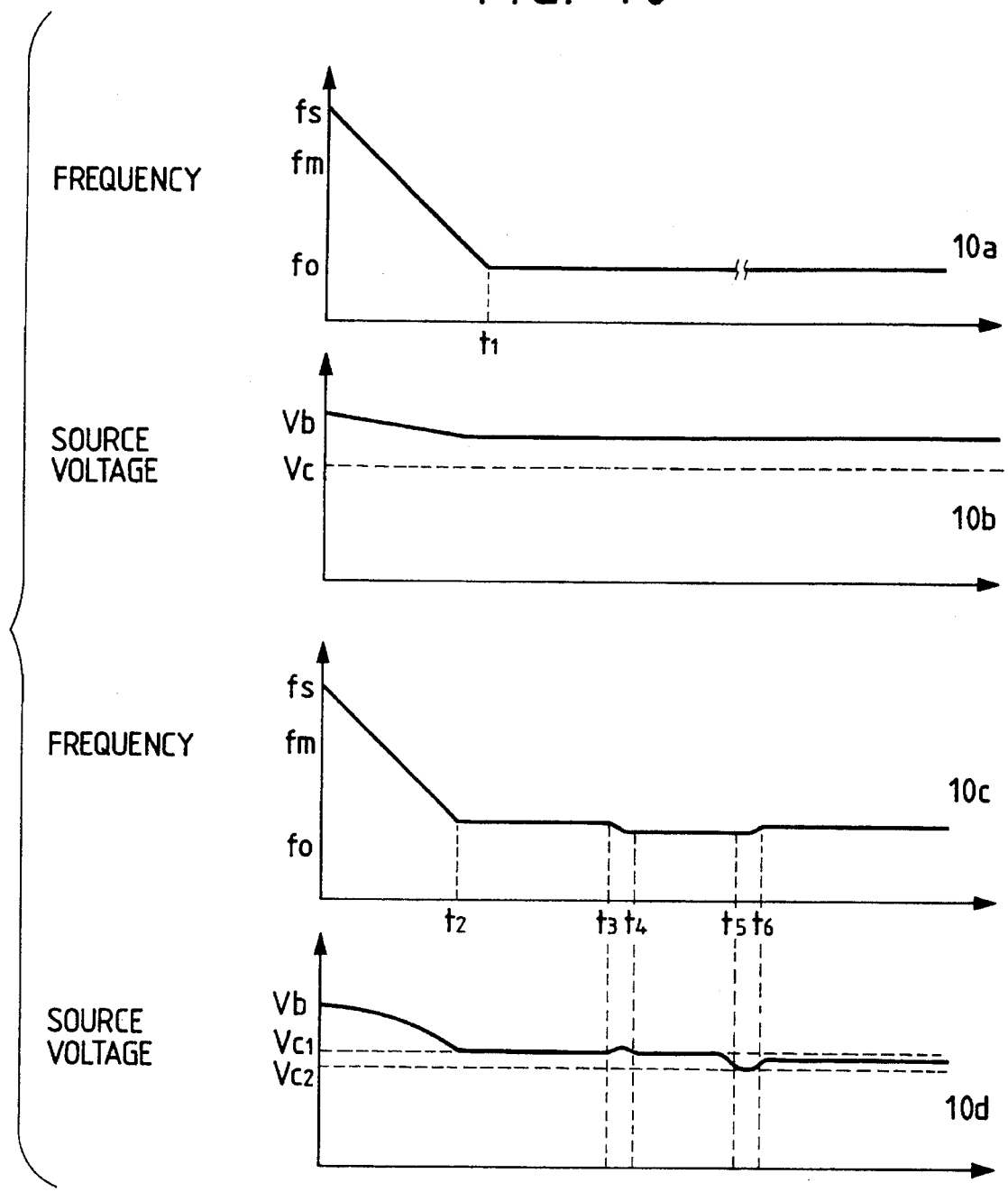
FIGS. 10a to 10d are timing charts for explaining an operation of the apparatus of the second embodiment.

FIGS. 10a and 10b are views for explaining an operation in which the voltage applied from a battery 22 to the DC/DC converter 21 is sufficiently high and the secondary voltage from the DC/DC converter 21 is not decreased. Referring to FIG. 10a, the driving frequency of the vibration wave motor is controlled by the microcomputer 1 and is scanned from the vibration wave motor start frequency fm to lower direction. On the other hand, the microcomputer 1 stops scanning of the frequency at time t1 when the interval between pulses generated upon rotation of a pulse plate 13 reaches the target interval or the phase difference between the A- and S-electrode driving signals of a vibration wave motor 9 which are detected by a phase detector 12 is a predetermined value.

FIGS. 10c and 10d are views for explaining an operation in which the voltage applied from the battery 22 to the DC/DC converter 21 is decreased, and the secondary voltage from the DC/DC converter 21 is decreased by an increase in load. Referring to FIG. 10c, the driving frequency of the vibration wave motor is scanned by the microcomputer 1 in the same manner as in FIG. 10a. As shown in FIG. 10d, before the interval between the pulses reaches the target interval or the phase difference reaches the predetermined value, the secondary voltage from the DC/DC converter 21 is decreased. When the secondary voltage reaches a predetermined voltage Vc1 at time t2, the microcomputer 1 detects this and stops scanning the frequency.

When the output voltage from the DC/DC converter 21 is restored due to a decrease in load or the like and becomes higher than the Vol level at time t3, the microcomputer 1 scans the frequency to a lower frequency. The output from the DC/DC converter is decreased again accordingly. When the voltage output from the DC/DC converter 21 becomes lower than Vc1 at time t4, the microcomputer 1 stops scanning the frequency.

When the output voltage from the DC/DC converter 21 is decreased by an increase in load or the like and becomes lower than the Vc2 level at time t5, the microcomputer 1 shifts the frequency to a higher frequency by a predetermined amount. When the output from the DC/DC converter 21 is restored, and becomes higher than the Vc2 level at time t6, the microcomputer 1 stops scanning the frequency.

Figure 11:
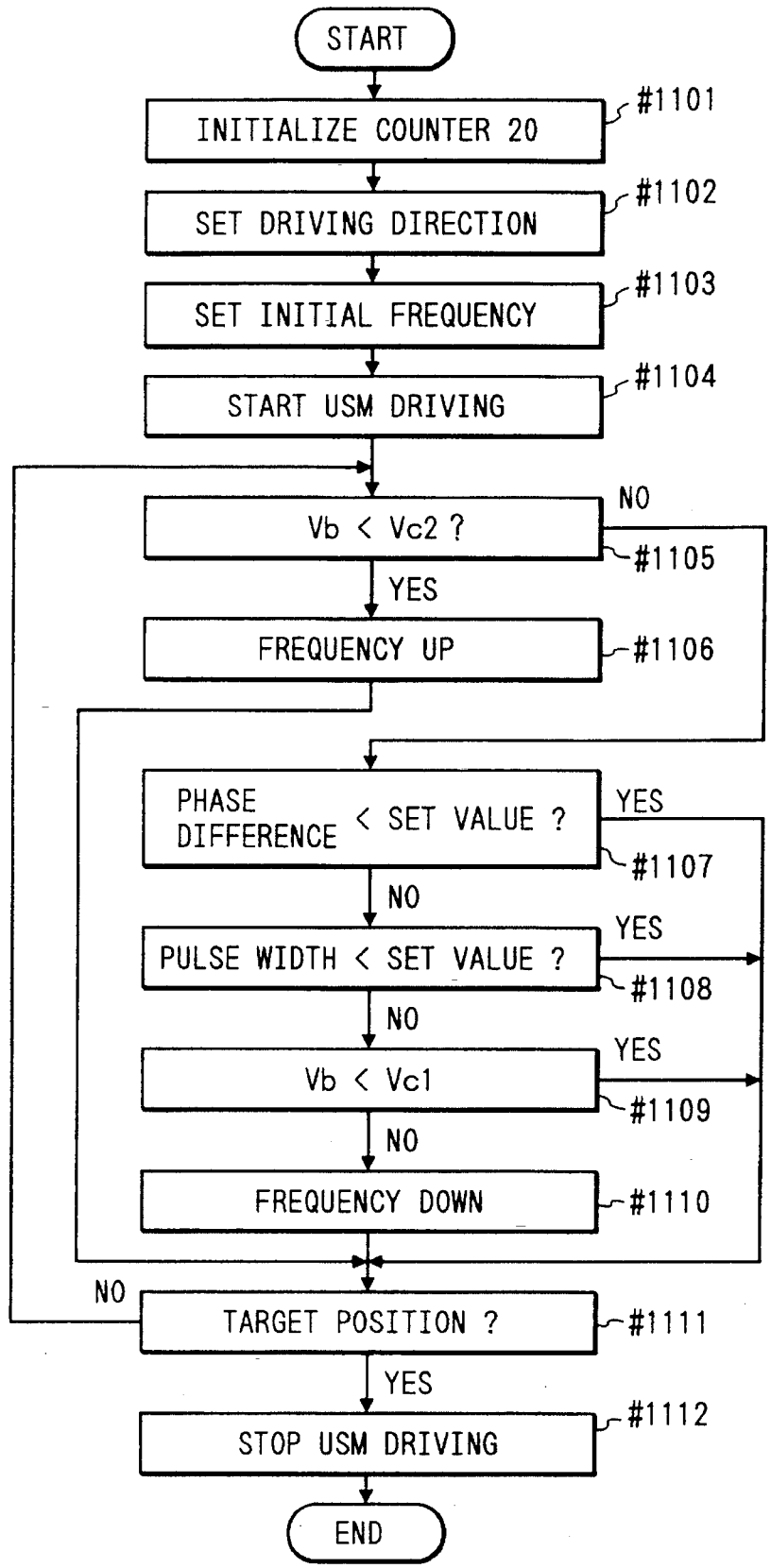
FIG. 11 is a flow chart for explaining the operation of the apparatus of the second embodiment.

The operation programmed in the microcomputer 1 will be described with reference to FIG. 11.

[Step 1101] A terminal RESET of the microcomputer 1 is set at Lo level for a predetermined period of time to initialize an up/down counter 20. A terminal DIR1 of the microcomputer 1 is set at Hi level to perform a count-up operation if the driving direction of the vibration wave motor is CCW. However, if the driving direction of the vibration wave motor is CW, then the terminal DIR1 of the microcomputer 1 is set at Lo level. Subsequently, a terminal CNT EN/$\overline{\text{DIS}}$ is set at Hi level to enable counting of the up/down counter 20.

[Step 1102] If the driving direction of the vibration wave motor is CCW, then a terminal DIR2 of the microcomputer 1 is set at Hi level. However, if the driving direction is CW, then the terminal DIR2 is set at Lo level.

[Step 1103] A terminal D/A OUT of the microcomputer 1 is set to have a value corresponding to an initial frequency fs.

[Step 1104] A terminal USM EN/$\overline{\text{DIS}}$ of the microcomputer 1 is set at Hi level to start driving the vibration wave motor.

[Step 1105] When an output Vb from the DC/DC converter 21 which is input through the voltage detector (A/D converter) 25 is the second comparison level Vc2 or more, the flow branches into step 1107. However, when the output Vb is less than the second comparison level Vc2, the flow branches into step 1106.

[Step 1106] The frequency is increased by a predetermined value to decelerate the vibration wave motor, and the flow jumps to step 1011.

[Step 1107] If the phase difference between the A- and S-electrodes detected by the phase detector 12 is smaller than a predetermined value, then the flow branches into step 1111 to stop acceleration. However, if the phase difference is the predetermined value or more, then the flow branches into step 1108 because the vibration wave motor can be further accelerated.

[Step 1108] The interval between pulses generated upon rotation of the pulse plate 13 is measured. If the pulse width is smaller than a predetermined value, then the flow branches into step 1111 to stop the acceleration. However, if the pulse width is the predetermined value or more, then the flow branches into step 1109 to accelerate the vibration wave motor to a target speed.

[Step 1109] The output Vb from the DC/DC converter 21 input through the A/D converter 25 is the first comparison level Vc1 or more, the flow branches into step 1110 to further accelerate the vibration wave motor. However, when the output Vb is less than the comparison level Vc1, the flow branches into step 1111 to stop accelerating the vibration wave motor.

[Step 1110] The frequency is decreased by a predetermined value to accelerate the vibration wave motor.

[Step 1111] A count value from the up/down counter 20 is fed to an input terminal PULSE IN of the microcomputer 1. If the current position does not reach a target driving position, then the flow returns to step 1105. However, if the current position reaches the target driving position, then the flow branches to step 1112.

[Step 1112] The output terminal USM EN/$\overline{DIS}$ of the microcomputer 1 is set at Lo level to finish driving the vibration wave motor.

In the above two embodiments, the DC/DC converter is used as a driving power supply of the vibration wave motor. However, a battery having a voltage high enough to drive the vibration wave motor may be directly used in place of the DC/DC converter.

Third Embodiment

Figure 12:
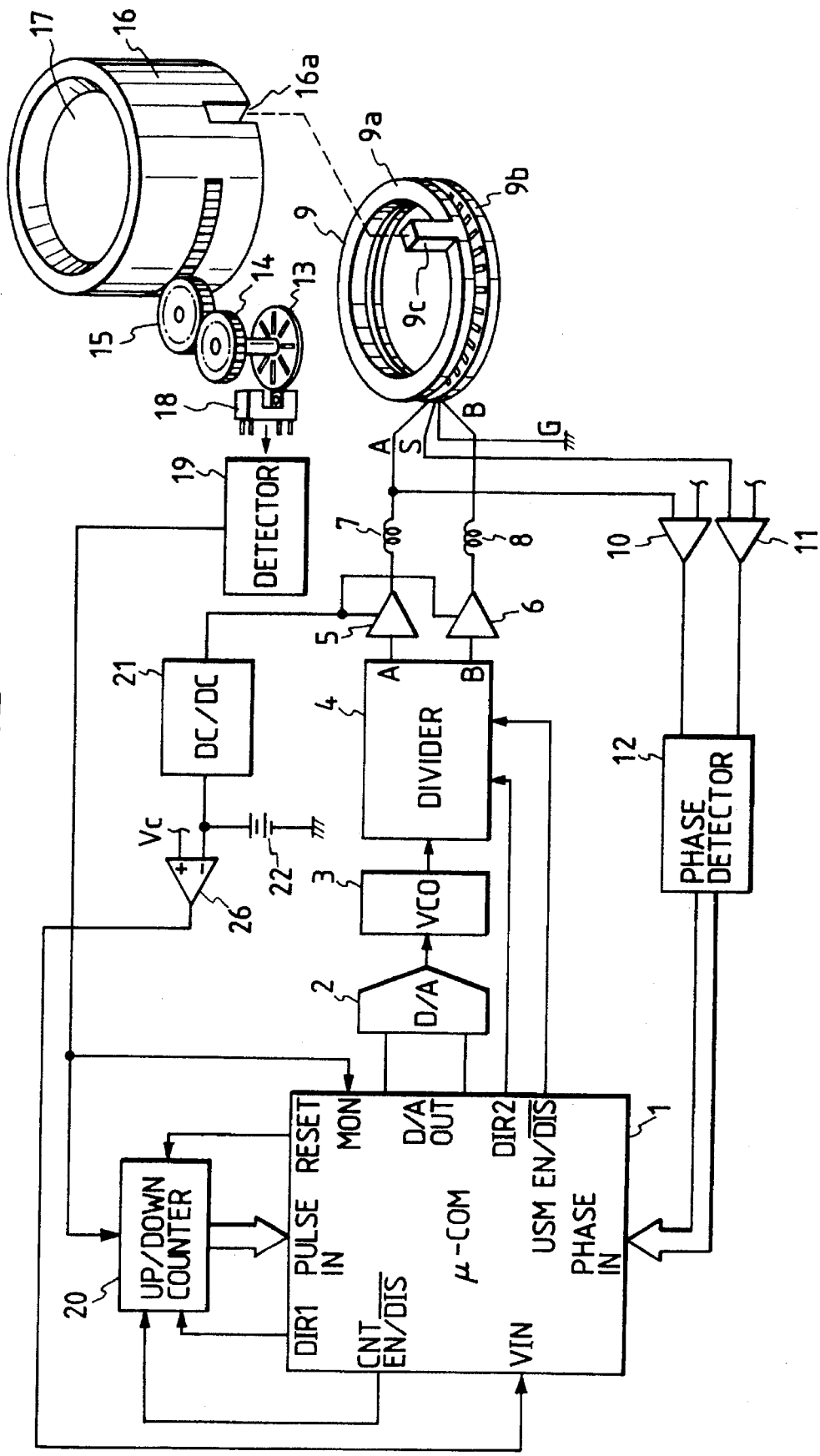
FIG. 12 is a schematic view showing an arrangement of an apparatus according to the third embodiment of the present invention.

FIG. 12 is a view showing the third embodiment of the present invention. The same reference numerals as in FIG. 1 denote the same constituent elements in FIG. 12.

Referring to FIG. 12, a comparator (voltage detector) 26 for detecting an output voltage (i.e., an input voltage to a DC/DC converter 21) of a battery 22. When the input voltage to the DC/DC converter 21 is higher than a given voltage, an output from the comparator 26 is set at Lo level. Otherwise, the output from the comparator 26 is set at Hi level.

The output from the comparator 26 is input to a terminal VIN of a microcomputer 1.

An operation of this embodiment will be described with reference to FIGS. 13a to 13e.

Figure 13:
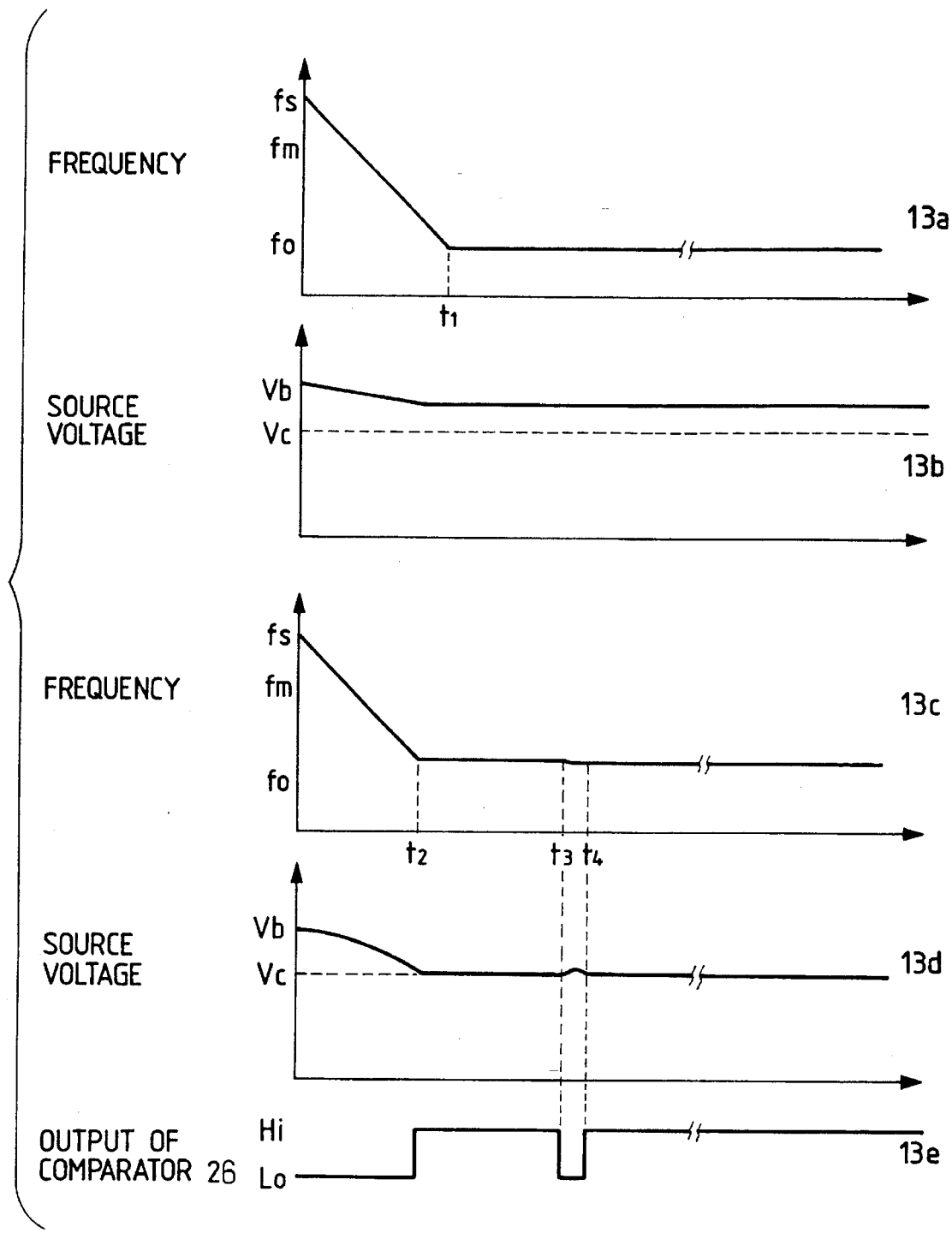
FIGS. 13a to 13e are timing charts for explaining an operation of the apparatus shown in FIG. 12.

The time is plotted along the abscissa of each of FIGS. 13a to 13e. A frequency f is plotted along the ordinate of each of FIGS. 13a and 13c and is increased upward. The secondary voltage from the DC/DC converter 21 is plotted along the ordinate of each of FIGS. 13b and 13d and is increased upward. FIG. 13e represents a digital signal output from the secondary voltage decrease detection voltage comparator 26, and the digital signal is set at Hi or Lo level.

FIGS. 13a and 13b are views for explaining an operation in which the voltage applied from the battery 22 to the DC/DC converter 21 is sufficiently high, and the battery voltage is not decreased below a comparison level Vc. Referring to FIG. 13a, the driving frequency of the vibration wave motor is controlled by the microcomputer 1 and is scanned from the vibration wave motor start frequency fm to the lower direction. On the other hand, the microcomputer 1 stops scanning the frequency at time t1 when the interval between pulses generated upon rotation of a pulse plate 13 reaches the target interval or the phase difference between the A-and S-electrode driving signals of a vibration wave motor 9 which are detected by a phase detector 12 is a predetermined value.

FIGS. 13c to 13e are views for explaining an operation in which the voltage applied from the battery 22 to the DC/DC converter 21 is decreased, and the battery voltage is decreased below the comparison level Vc. Referring to FIG. 13c, the driving frequency of the vibration wave motor is scanned by the microcomputer 1 in the same manner as in FIG. 13a. As shown in FIG. 13d, before the interval between the pulses reaches the target interval or the phase difference reaches the predetermined value, the voltage from the battery 22 is decreased. When the voltage of the battery 22 reaches the predetermined comparison voltage Vc at time t2, the output from the comparator 26 goes from Lo level to Hi level, and the microcomputer 1 detects this and stops scanning the frequency. When the output voltage from the battery 22 is restored due to a decrease in load or the like and becomes higher than the Vc level at time t3, the output from the comparator 26 goes from Hi level to Lo level, and the microcomputer 1 scans the frequency to a lower frequency. The output from the battery 22 is decreased again accordingly. When the voltage output from the battery 22 becomes lower than Vc at time t4, the output from the comparator 26 goes from Lo level to Hi level, and the microcomputer 1 stops scanning the frequency.

Figure 14:
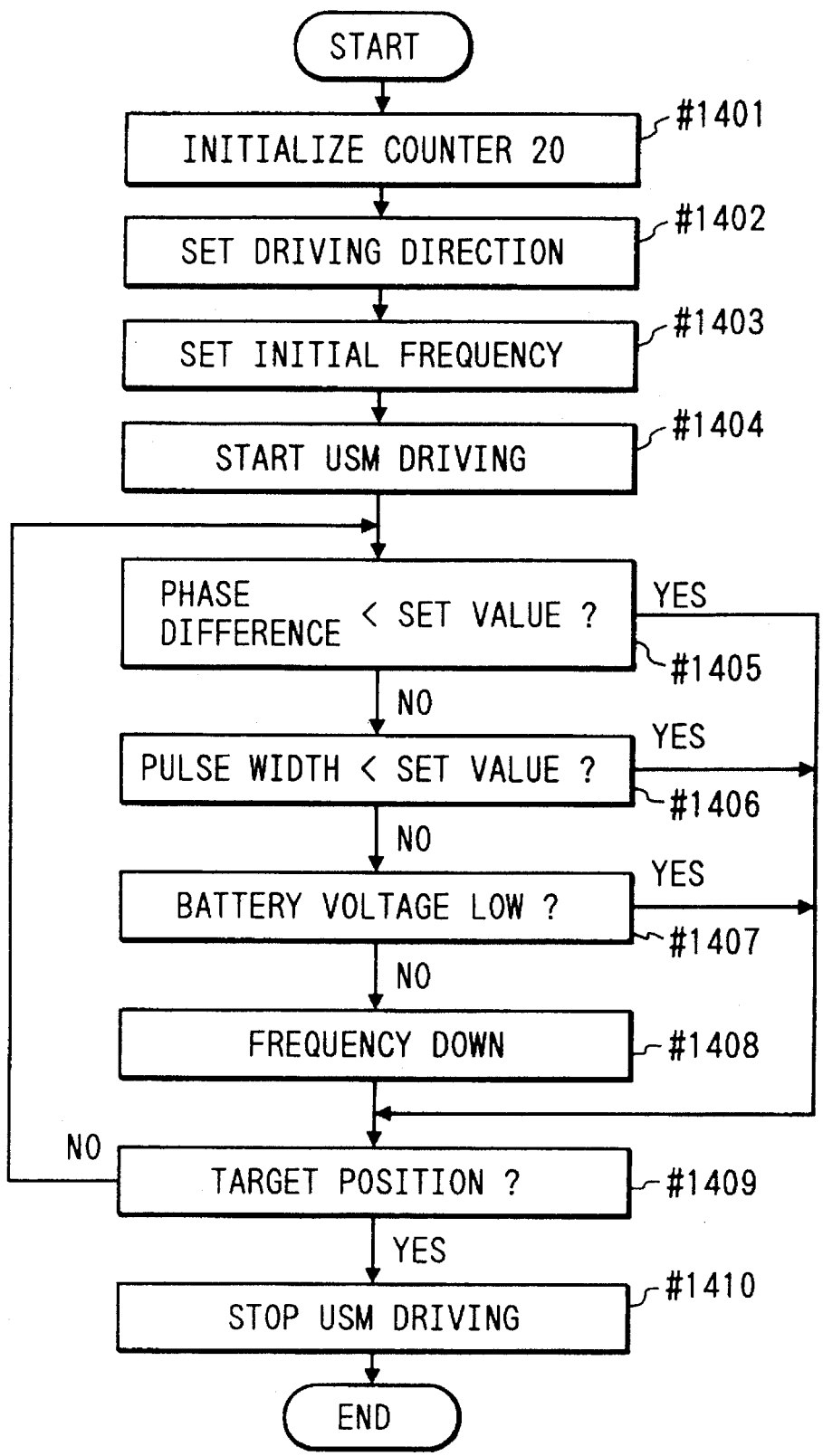
FIG. 14 is a flow chart for explaining the operation of the apparatus shown in FIG. 12.

The operation programmed in the microcomputer 1 will be described with reference to FIG. 14.

[Step 1401] A terminal RESET of the microcomputer 1 is set at Lo level for a predetermined period of time to initialize an up/down counter 20. A terminal DIR1 of the microcomputer 1 is set at Hi level to perform a count-up operation if the driving direction of the vibration wave motor is CCW. However, if the driving direction of the vibration wave motor is CW, then the terminal DIR1 of the microcomputer 1 is set at Lo level. Subsequently, a terminal CNT EN/$\overline{DIS}$ is set at Hi level to enable counting of the up/down counter 20.

[Step 1402] If the driving direction of the vibration wave motor is CCW, then a terminal DIR2 of the microcomputer 1 is set at Hi level. However, if the driving direction is CW, then the terminal DIR2 is set at Lo level.

[Step 1403] A terminal D/A OUT of the microcomputer 1 is set to have a value corresponding to an initial frequency fs.

[Step 1404] A terminal USM EN/$\overline{DIS}$ of the microcomputer 1 is set at Hi level to start driving the vibration wave motor.

[Step 1405] If the phase difference between the A- and S-electrodes detected by the phase detector 12 is smaller than a predetermined value, then the flow branches into step 1409 to stop acceleration. However, if the phase difference is then the predetermined value or more, the flow branches into step 1406 because the vibration wave motor can be further accelerated.

[Step 1406] The interval between pulses generated upon rotation of the pulse plate 13 is measured. If the pulse width is smaller than a predetermined value, then the flow branches into step 1409 to stop the acceleration. However, if the pulse width is the predetermined value or more, then the flow branches into step 1407 to accelerate the vibration wave motor to a target speed.

[Step 1407] If the output from the comparator 26 is set at Lo level, then the voltage from the battery 22 is the comparison level or more, and the flow branches into step 1408 to further accelerate the vibration wave motor. However, if the output from the comparator 26 is set at Hi level, and the battery voltage is lower than the comparison level, then the flow branches into step 1409 to stop accelerating the vibration wave motor.

[Step 1408] The frequency is decreased by a predetermined value to accelerate the vibration wave motor.

[Step 1409] A count value from the up/down counter 20 is fed to an input terminal PULSE IN of the microcomputer 1. If the current position does not reach a target driving position, the flow returns to step 1405. However, if the current position reaches the target driving position, then the flow branches to step 1410.

[Step 1410] The output terminal USM EN/$\overline{\text{DIS}}$ of the microcomputer 1 is set at Lo level to finish driving the vibration wave motor.

Fourth Embodiment

Figure 15:
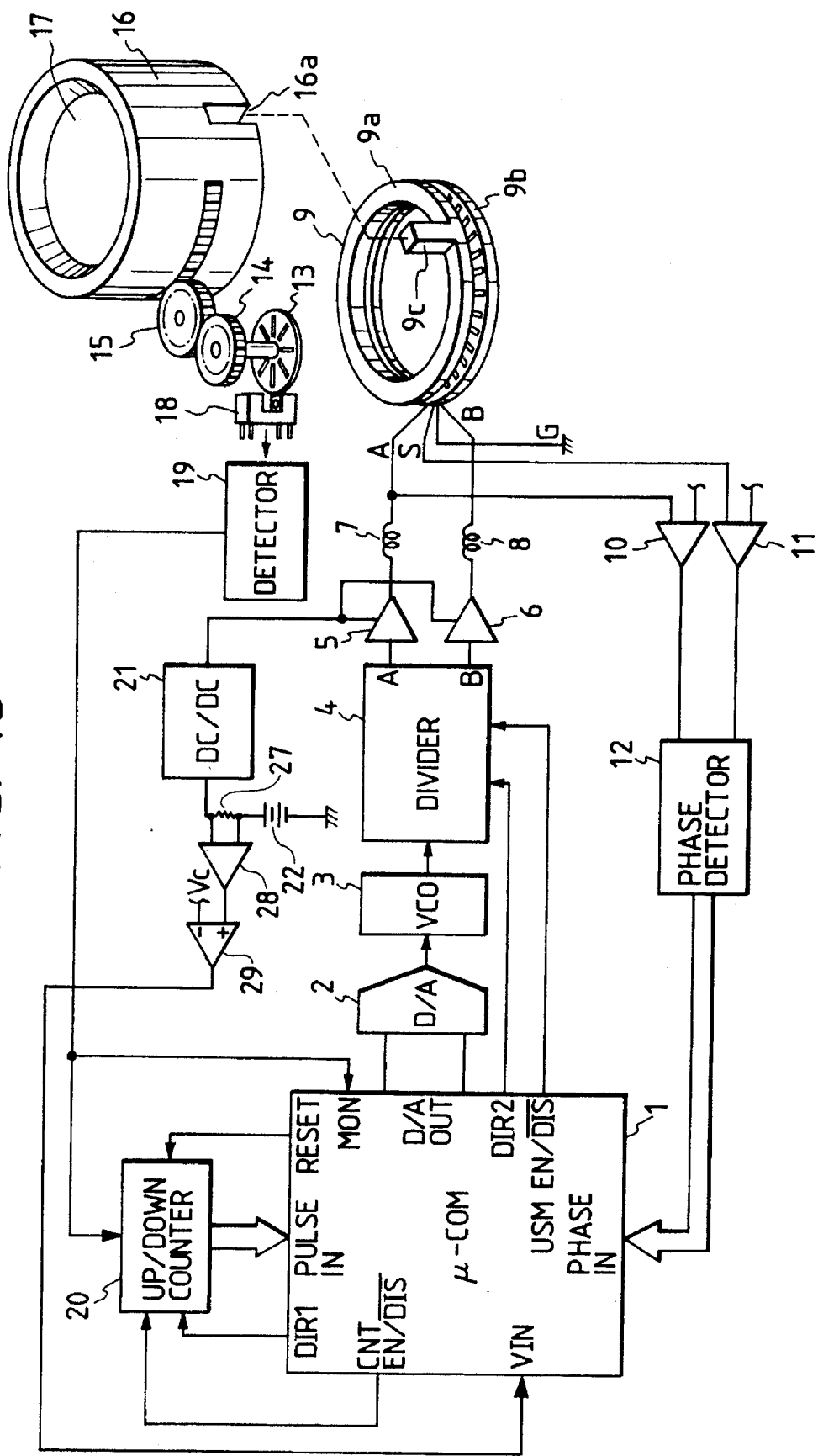
FIG. 15 is a schematic view showing an arrangement of an apparatus according to the fourth embodiment of the present invention.

FIG. 15 is a view showing the fourth embodiment of the present invention. A description of the same parts as in FIG. 12 will be omitted. An apparatus of this embodiment includes a resistor 27, a differential amplifier 28, and a comparator 29. The differential amplifier 28 amplifies the voltage across the resistor 27, i.e., the voltage corresponding to the input current to a DC/DC converter 21. The comparator 29 outputs a signal of Lo level until a current flowing through the DC/DC converter 21 reaches a predetermined value. However, when the current flowing through the DC/DC converter 21 exceeds the predetermined value, the output from the comparator 29 is set at Hi level.

Figure 16:
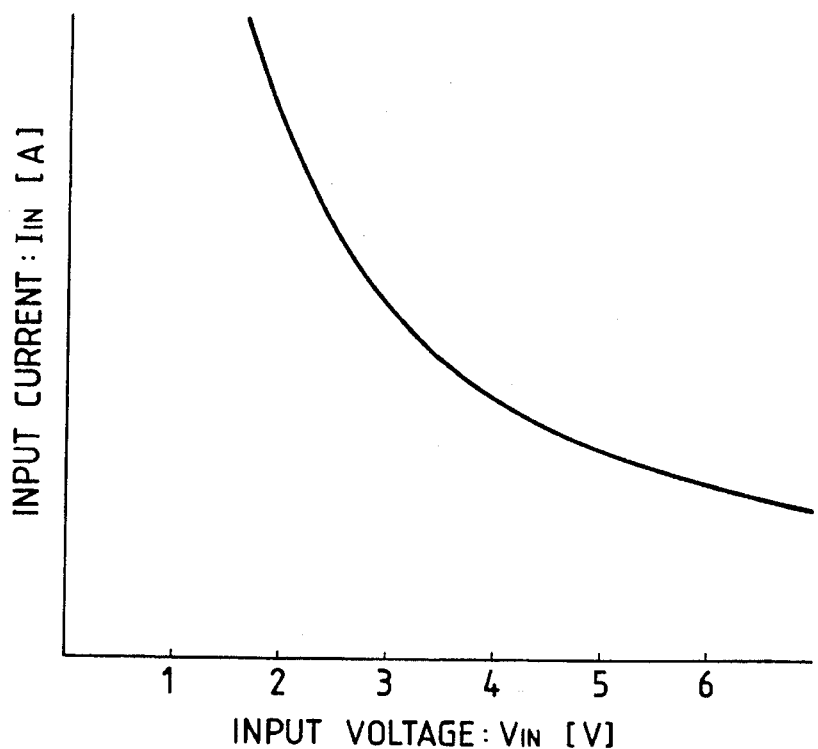
FIG. 16 is a graph showing characteristics of a DC/DC converter of the apparatus shown in FIG. 15.

FIG. 16 is a graph showing input voltage vs. input current characteristics of the DC/DC converter 21 in a constant power load state. The input current is increased at an almost output power/input voltage ratio with a decrease in input voltage.

An operation of the fourth embodiment will be described with reference to FIGS. 17a to 17e. The time is plotted along the abscissa of each of FIGS. 17a to 17e. A frequency f is plotted along the ordinate of each of FIGS. 17a and 17c and is increased upward. The input current to the DC/DC converter 21 is plotted along the ordinate of each of FIGS. 17b and 17d and is increased upward. FIG. 17e represents a digital signal output from the input current increase detection voltage comparator 29, and the digital signal is set at Hi or Lo level.

FIGS. 17a and 17b are views for explaining an operation in which a battery 22 for driving the vibration wave motor is a new one and has a sufficiently high voltage, and an input current to the DC/DC converter 21 is not increased exceeding a comparison level Ic. Referring to FIG. 17a, the driving frequency of the vibration wave motor is controlled by a microcomputer 1 and is scanned from the vibration wave motor start frequency fm to lower direction. On the other hand, the microcomputer 1 stops scanning the frequency at time t1 when the interval between pulses generated upon rotation of a pulse plate 13 reaches the target interval or the phase difference between the A- and S-electrode driving signals of a vibration wave motor 9 which are detected by a phase detector 12 is a predetermined value.

FIGS. 17c to 17e are views for explaining an operation in which the battery 22 for driving the vibration wave motor is almost dead, the voltage from the battery 22 is greatly decreased with an increase in load, and the input current to the DC/DC converter 21 is increased. Referring to FIG. 17c, the driving frequency of the vibration wave motor is scanned by the microcomputer 1 in the same manner as in FIG. 17a. As shown in FIG. 17d, before the interval between the pulses reaches the target interval or the phase difference reaches the predetermined value, the voltage from the battery 22 is decreased. When the input current to the DC/DC converter 21 reaches the predetermined comparison current Ic at time t2, the output from the comparator 29 goes from Lo level to Hi level. The microcomputer 1 detects this and stops scanning the frequency. When the output voltage from the battery 22 is restored due to a decrease in load or the like, and the input current to the DC/DC converter 21 is smaller than the Ic level at time t3, the output from the comparator 29 goes from Hi level to Lo level, and the microcomputer 1 scans the frequency to a lower frequency. The output from the battery 22 is decreased again and the input current to the DC/DC converter 21 is increased accordingly. When the input current to the DC/DC converter 21 exceeds the comparison level Ic at time t4, the output from the comparator 29 goes from Lo level to Hi level, and the microcomputer 1 stops scanning the frequency.

Figure 18:
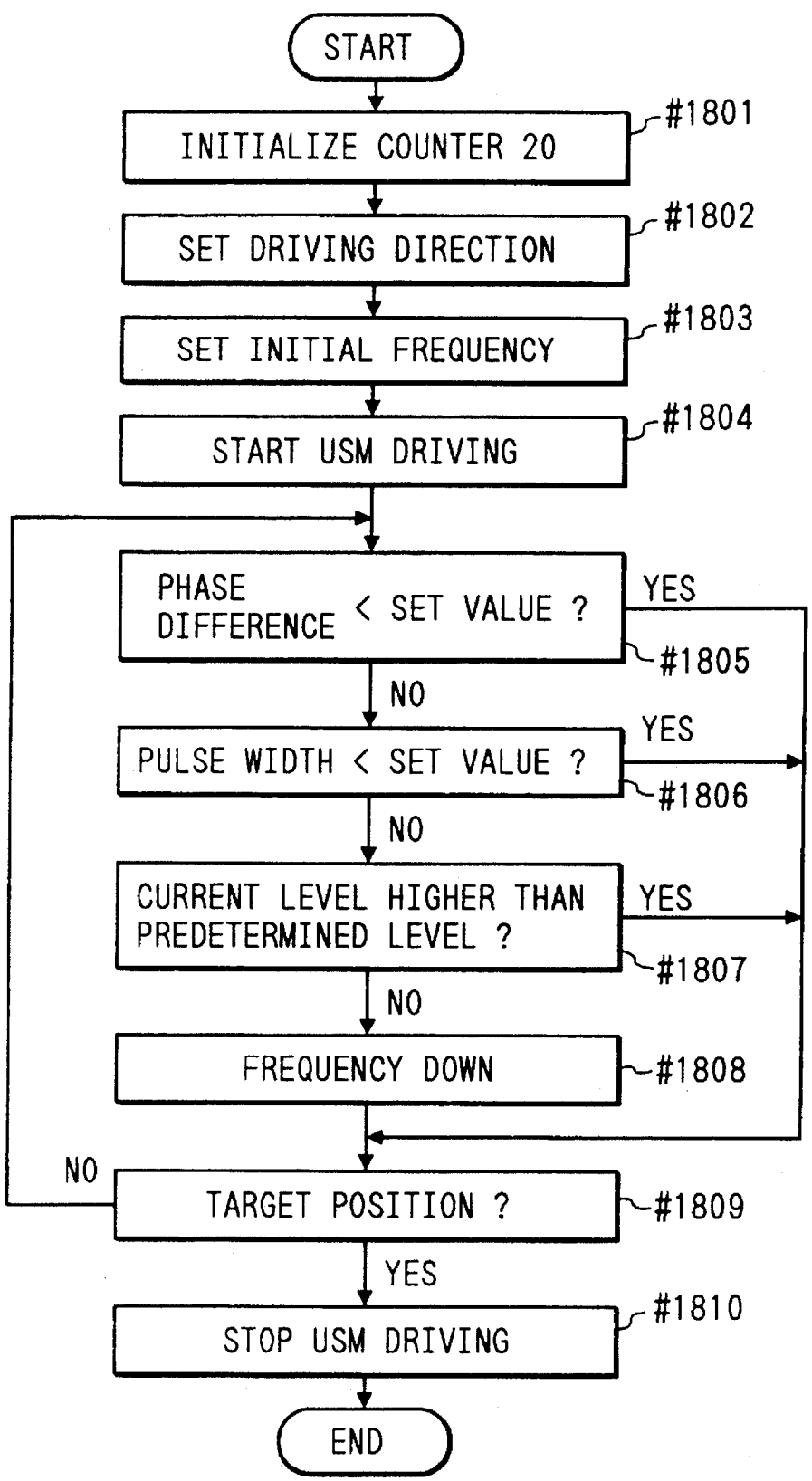
FIG. 18 is a flow chart for explaining the operation of the apparatus shown in FIG. 15.

The operation programmed in the microcomputer 1 will be described with reference to FIG. 18.

[Step 1801] A terminal RESET of the microcomputer 1 is set at Lo level for a predetermined period of time to initialize an up/down counter 20. A terminal DIR1 of the microcomputer 1 is set at Hi level to perform a count-up operation if the driving direction of the vibration wave motor is CCW. However, if the driving direction of the vibration wave motor is CW, then the terminal DIR1 of the microcomputer 1 is set at Lo level. Subsequently, a terminal CNT EN/$\overline{\text{DIS}}$ is set at Hi level to enable counting of the up/down counter 20.

[Step 1802] If the driving direction of the vibration wave motor is CCW, then a terminal DIR2 of the microcomputer 1 is set at Hi level. However, if the driving direction is CW, then the terminal DIR2 is set at Lo level.

[Step 1803] A terminal D/A OUT of the microcomputer 1 is set to have a value corresponding to an initial frequency fs.

[Step 1804] A terminal USM EN/$\overline{\text{DIS}}$ of the microcomputer 1 is set at Hi level to start driving the vibration wave motor.

[Step 1805] If the phase difference between the A- and S-electrodes detected by the phase detector 12 is smaller than a predetermined value, then the flow branches into step 1809 to stop acceleration. However, if the phase difference is the predetermined value or more, then the flow branches into step 1806 because the vibration wave motor can be further accelerated.

[Step 1806] The interval between pulses generated upon rotation of the pulse plate 13 is measured. If the pulse width is smaller than a predetermined value, then the flow branches into step 1809 to stop the acceleration. However, if the pulse width is the predetermined value or more, then the flow branches into step 1807 to accelerate the vibration wave motor to a target speed.

[Step 1807] If the output from the comparator 29 is set at Lo level, then the input current to the DC/DC converter 21 is less than the comparison level, and the flow branches into step 1808 to further accelerate the vibration wave motor. However, if the output from the comparator 29 is set at Hi level, and the input current is the comparison level or more, then the flow branches into step 1809 to stop accelerating the vibration wave motor.

[Step 1808] The frequency is decreased by a predetermined value to accelerate the vibration wave motor.

[Step 1809] A count value from the up/down counter 20 is fed to an input terminal PULSE IN of the microcomputer 1. If the current position does not reach a target driving position, then the flow returns to step 1805. However, if the current position reaches the target driving position, then the flow branches to step 1810.

[Step 1810] The output terminal USM EN/$\overline{\text{DIS}}$ of the microcomputer 1 is set at Lo level to finish driving the vibration wave motor.

Fifth Embodiment

Figure 19:
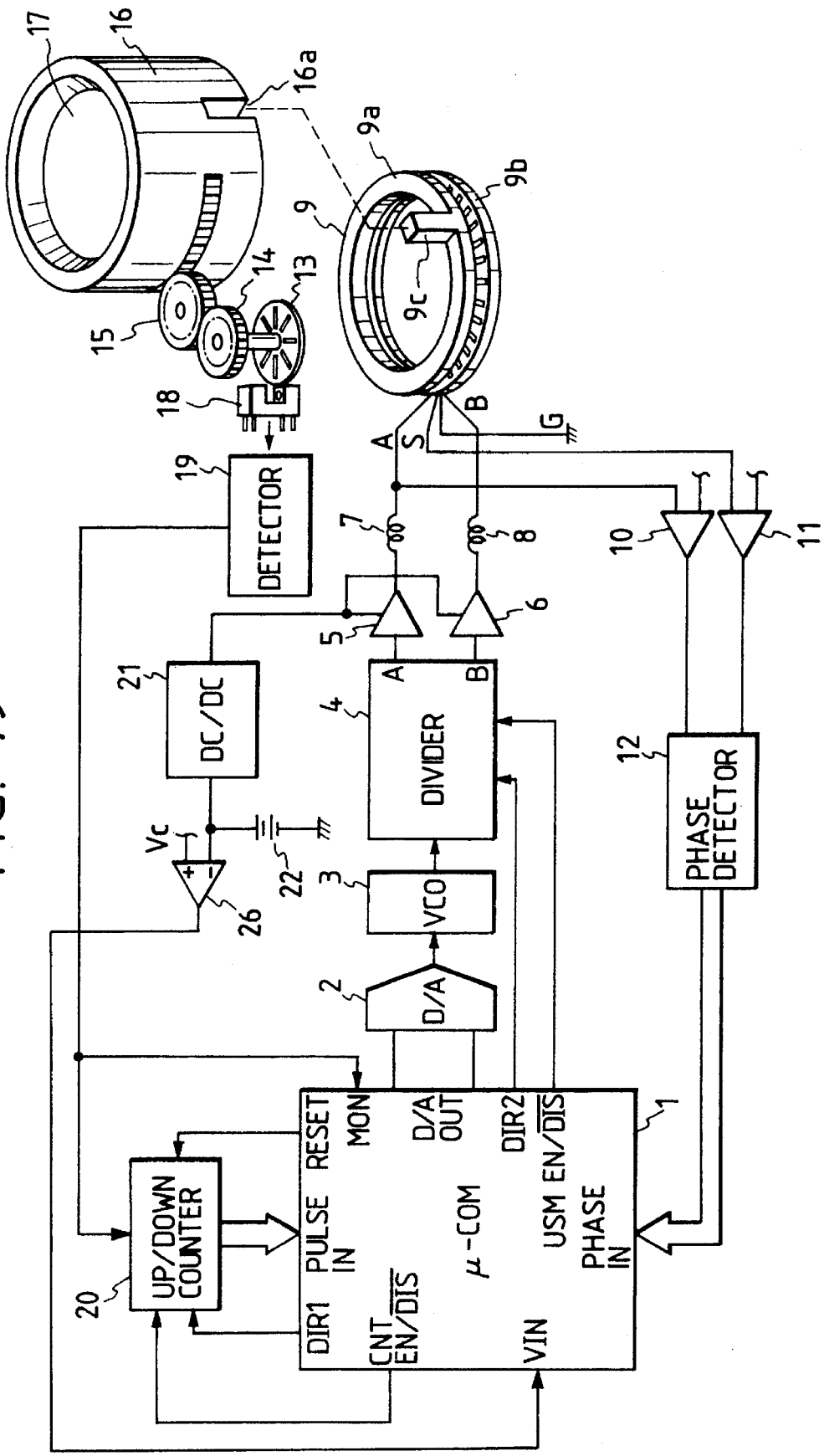
FIG. 19 is a schematic view showing an arrangement of an apparatus according to the fifth embodiment of the present invention.

FIG. 19 is a view showing the fifth embodiment of the present invention. A description of the same parts as in FIG. 12 will be omitted.

An operation of this embodiment will be described with reference to FIGS. 20a to 20e.

Figure 20:
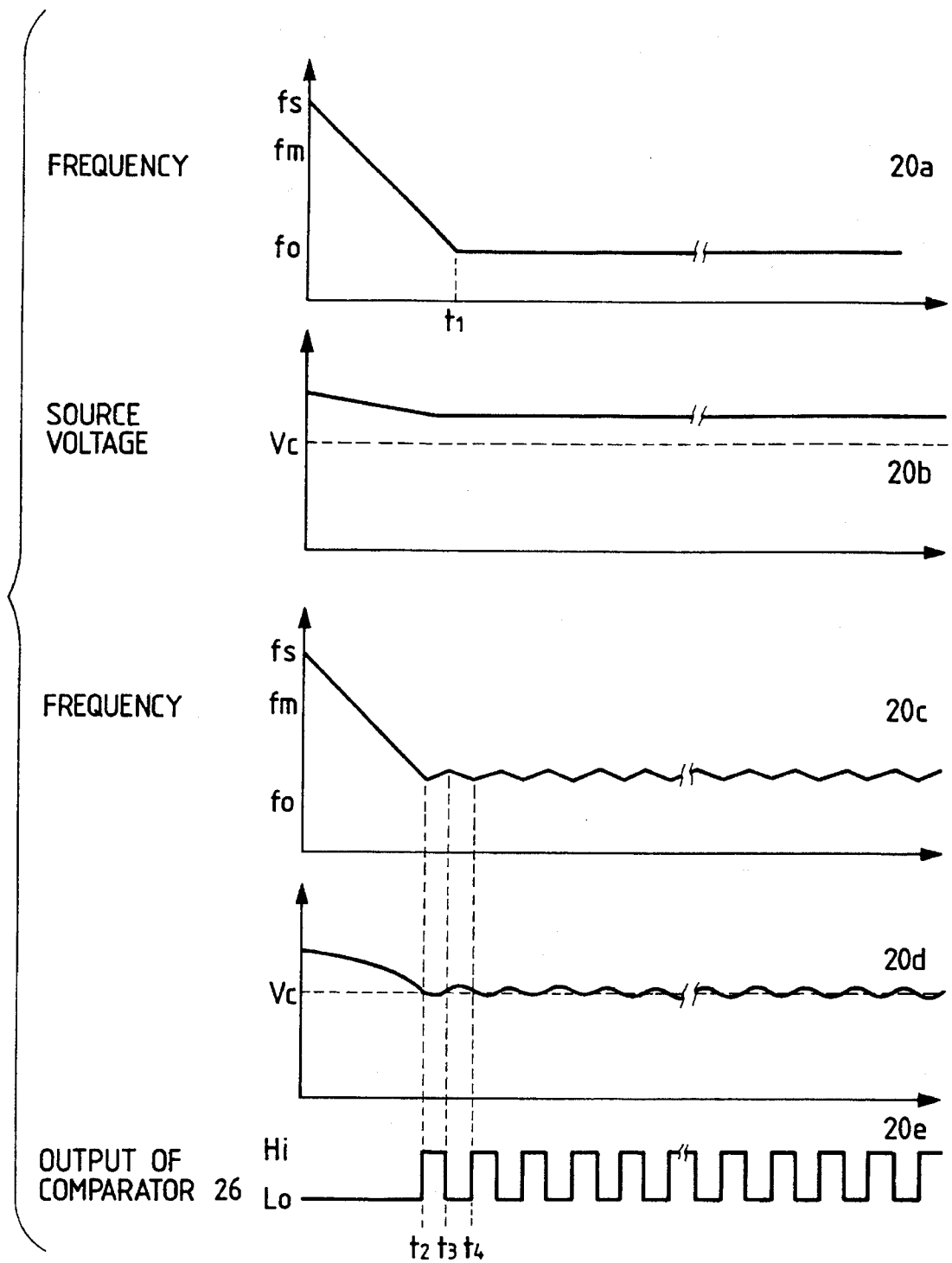
FIGS. 20a to 20e are timing charts for explaining an operation of the apparatus of the fifth embodiment.

The time is plotted along the abscissa of each of FIGS. 20a to 20e. A frequency f is plotted along the ordinate of each of FIGS. 20a and 20c and is increased upward. The secondary voltage from a DC/DC converter 21 is plotted along the ordinate of each of FIGS. 20b and 20d and is increased upward. FIG. 20e represents a digital signal output from a secondary voltage decrease detection voltage comparator 26, and the digital signal is set at Hi or Lo level.

FIGS. 20a and 20b are views for explaining an operation in which the voltage applied from a battery 22 to the DC/DC converter 21 is sufficiently high, and the battery voltage is not decreased below a comparison level Vc. Referring to FIG. 20a, the driving frequency of the vibration wave motor is controlled by a microcomputer 1 and is scanned from the vibration wave motor start frequency fm to lower direction. On the other hand, the microcomputer 1 stops scanning the frequency at time t1 when the interval between pulses generated upon rotation of a pulse plate 13 reaches the target interval or the phase difference between the A- and S-electrode driving signals of a vibration wave motor 9 which are detected by a phase detector 12 is a predetermined value.

FIGS. 20c to 20e are views for explaining an operation in which the voltage applied from the battery 22 to the DC/DC converter 21 is decreased, and the battery voltage is decreased below the comparison level Vc. Referring to FIG. 20c, the driving frequency of the vibration wave motor is scanned by the microcomputer 1 in the same manner as in FIG. 20a. As shown in FIG. 20d, before the interval between the pulses reaches the target interval or the phase difference reaches the predetermined value, the voltage from the battery 22 is decreased. When the voltage of the battery 22 reaches the predetermined comparison voltage Vc at time t2, the output from the comparator 26 goes from Lo level to Hi level, and the microcomputer 1 detects this and stops scanning the frequency to a lower frequency. The driving frequency is shifted to a higher frequency by a predetermined amount until the voltage from the battery 22 becomes the comparison level Vc or more. When the output voltage from the battery 22 is the comparison level Vc or more at time t3, the output from the comparator 26 goes from Hi level to Lo level, and the microcomputer 1 scans the frequency to a lower frequency. The output from the battery 22 is decreased again accordingly. When the voltage output from the battery 22 becomes lower than Vc at time t4, the output from the comparator 26 goes from Lo level to Hi level, and the microcomputer 1 stops scanning the frequency. The driving frequency is shifted to a higher frequency by a predetermined amount. The above operations are repeated to maintain the voltage from the battery 22 to be almost Vc as the comparison level.

Figure 21:
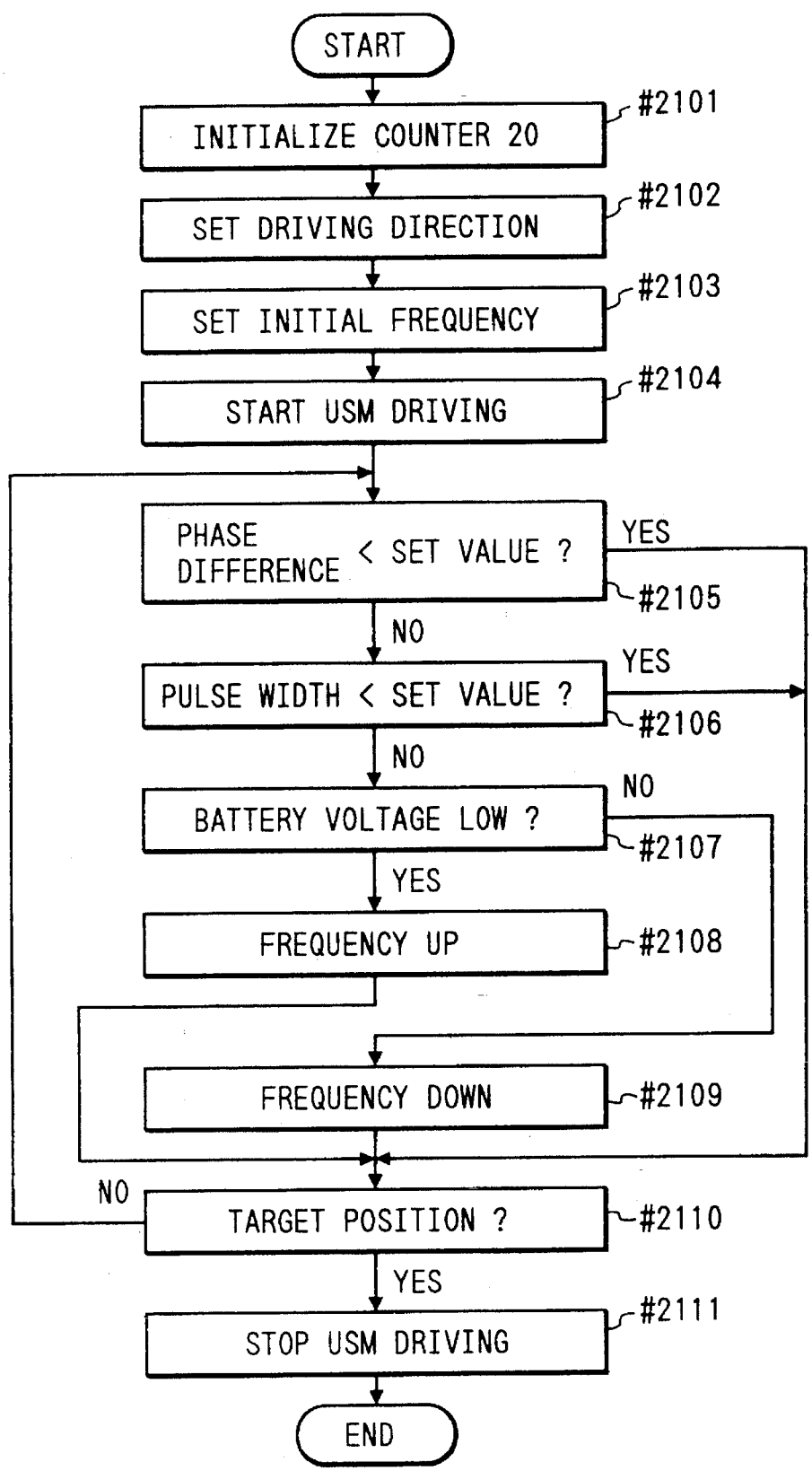
FIG. 21 is a flow chart for explaining the operation of the apparatus of the fifth embodiment.

The operation programmed in the microcomputer 1 will be described with reference to FIG. 21.

[Step 2101] A terminal RESET of the microcomputer 1 is set at Lo level for a predetermined period of time to initialize an up/down counter 20. A terminal DIR1 of the microcomputer 1 is set at Hi level to perform a count-up operation if the driving direction of the vibration wave motor is CCW. However, if the driving direction of the vibration wave motor is CW, then terminal DIR1 of the microcomputer 1 is set at Lo level. Subsequently, a terminal CNT EN/$\overline{\text{DIS}}$ is set at Hi level to enable counting of the up/down counter 20.

[Step 2102] If the driving direction of the vibration wave motor is CCW, then a terminal DIR2 of the microcomputer 1 is set at Hi level. However, if the driving direction is CW, then the terminal DIR2 is set at Lo level.

[Step 2103] A terminal D/A OUT of the microcomputer 1 is set to have a value corresponding to an initial frequency fs.

[Step 2104] A terminal USM EN/$\overline{\text{DIS}}$ of the microcomputer 1 is set at Hi level to start driving the vibration wave motor.

[Step 2105] If the phase difference between the A- and S-electrodes detected by the phase detector 12 is smaller than a predetermined value, then the flow branches into step 2110 to stop acceleration. However, if the phase difference is the predetermined value or more, then the flow branches into step 2106 because the vibration wave motor can be further accelerated.

[Step 2106] The interval between pulses generated upon rotation of the pulse plate 13 is measured. If the pulse width is smaller than a predetermined value, then the flow branches into step 2110 to stop the acceleration. However, if the pulse width is the predetermined value or more, then the flow branches into step 2107 to accelerate the vibration wave motor to a target speed.

[Step 2107] If the output from the comparator 26 is set at Lo level, and the voltage from the battery 22 is the comparison level or more, then the flow branches into step 2109 to further accelerate the vibration wave motor. However, if the output from the comparator 26 is set at Hi level, the battery voltage is lower than the comparison level, then the flow branches into step 2108 to stop accelerating the vibration wave motor.

[Step 2108] The frequency is increased by a predetermined value to decelerate the vibration wave motor, and the flow jumps to step 2110.

[Step 2109] The frequency is decreased by a predetermined value to accelerate the vibration wave motor.

[Step 2110] A count value from the up/down counter 20 is fed to an input terminal PULSE IN of the microcomputer 1. If the current position does not reach a target driving position, then flow returns to step 2105. However, if the current position reaches the target driving position, then the flow branches to step 2111.

[Step 2111] The output terminal USM EN/$\overline{\text{DIS}}$ of the microcomputer 1 is set at Lo level to finish driving the vibration wave motor.

Sixth Embodiment

Figure 22:
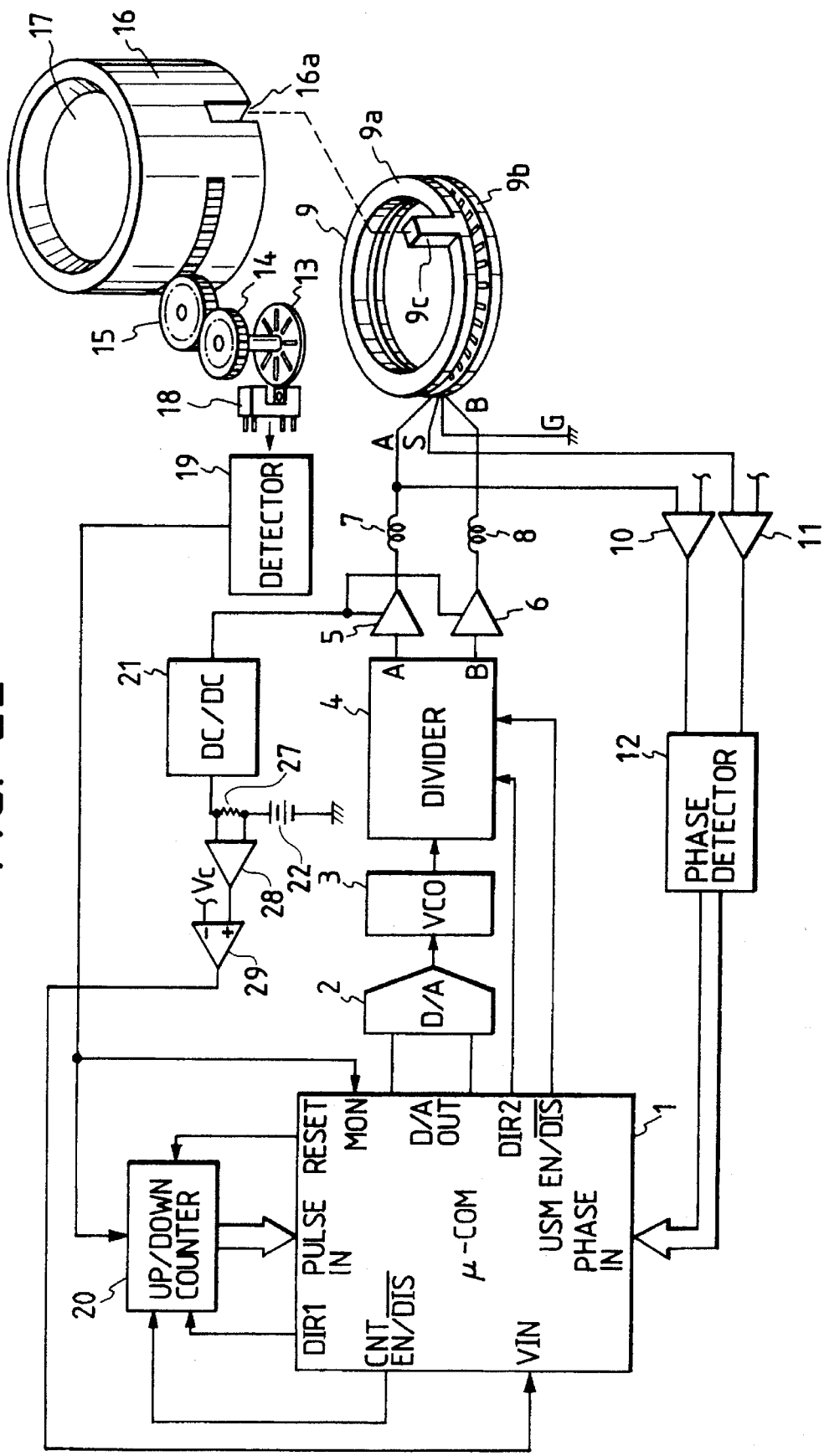
FIG. 22 is a schematic view showing an arrangement of an apparatus according to the sixth embodiment of the present invention.

FIG. 22 is a view showing the sixth embodiment of the present invention. A description of the same parts as in FIG.

15 will be omitted. An apparatus of this embodiment includes a resistor 27, a differential amplifier 28, and a comparator 29. The differential amplifier 28 amplifies the voltage across the resistor 27, i.e., the voltage corresponding to the input current to a DC/DC converter 21. The comparator 29 outputs a signal of Lo level until a current flowing through the DC/DC converter 21 reaches a predetermined value. However, when the current flowing through the DC/DC converter 21 exceeds the predetermined value, the output from the comparator 29 is set at Hi level.

Figure 23:
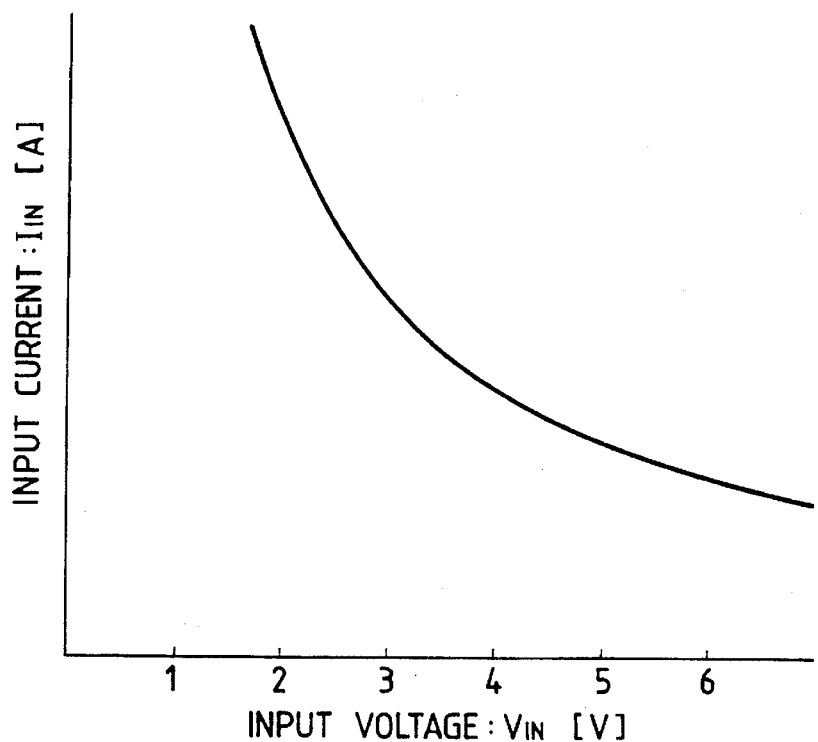
FIG. 23 is a graph showing characteristics of a DC/DC converter of the apparatus shown in FIG. 22.

FIG. 23 is a graph showing input voltage vs. input current characteristics of the DC/DC converter 21 in a constant power load state. The input current is increased at an almost output power/input voltage ratio with a decrease in input voltage.

An operation of the sixth embodiment will be described with reference to FIGS. 24a to 24e. The time is plotted along the abscissa of each of FIGS. 24a to 24e. A frequency f is plotted along the ordinate of each of FIGS. 24a and 24c and is increased upward. The input current to the DC/DC converter 21 is plotted along the ordinate of each of FIGS. 24b and 24d and is increased upward. FIG. 24e represents a digital signal output from the input current increase detection voltage comparator 29, and the digital signal is set at Hi or Lo level.

FIGS. 24a and 24b are views for explaining an operation in which a battery 22 for driving the vibration wave motor is a new one and has a sufficiently high voltage, and an input current to the DC/DC converter 21 is not increased exceeding a comparison level Ic. Referring to FIG. 24a, the driving frequency of the vibration wave motor is controlled by a microcomputer 1 and is scanned from the vibration wave motor start frequency fm to the lower frequency direction. On the other hand, the microcomputer 1 stops scanning the frequency at time t1 when the interval between pulses generated upon rotation of a pulse plate 13 reaches the target interval or the phase difference between the A- and S-electrode driving signals of a vibration wave motor 9 which are detected by a phase detector 12 is a predetermined value.

FIGS. 24c to 24e are views for explaining an operation in which the battery 22 for driving the vibration wave motor is almost dead, the voltage from the battery 22 is greatly decreased with an increase in load, and the input current to the DC/DC converter 21 is increased. Referring to FIG. 24c, the driving frequency of the vibration wave motor is scanned by the microcomputer 1 in the same manner as in FIG. 24a. As shown in FIG. 24d, before the interval between the pulses reaches the target interval or the phase difference reaches the predetermined value, the voltage from the battery 22 is decreased. When the input current to the DC/DC converter 21 reaches the predetermined comparison current Ic at time t2, the output from the comparator 29 goes from Lo level to Hi level. The microcomputer 1 detects this and stops scanning the frequency. The driving frequency is shifted to a higher frequency by a predetermined amount until the input current is less than the comparison level Ic. When the input current is less than the comparison level Ic at time t3, the output from the comparator 29 goes from Hi level to Lo level, and the microcomputer 1 scans the frequency to a lower frequency. The input current to the DC/DC converter 21 is increased accordingly. When the input current to the DC/DC converter 21 exceeds the comparison level Ic at time t4, the output from the comparator 29 goes from Lo level to Hi level, and the microcomputer 1 stops scanning the frequency. The driving frequency is shifted to a higher frequency by a predetermined amount. The above operations are repeated to maintain the voltage from the battery 22 to be almost Vc as the comparison level.

Figure 25:
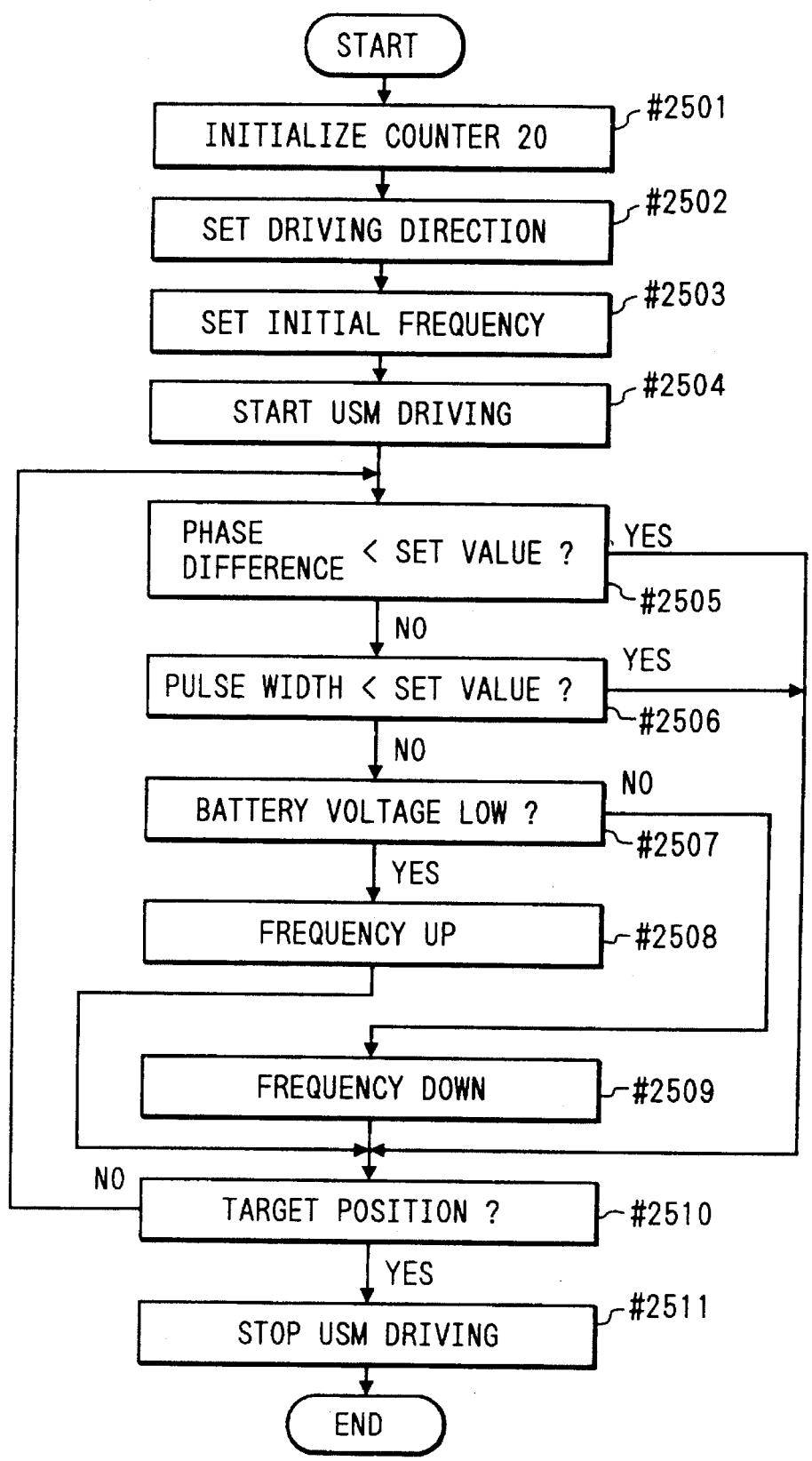
FIG. 25 is a flow chart for explaining an operation of the apparatus shown in FIG. 22.

The operation programmed in the microcomputer 1 will be described with reference to FIG. 25.

[Step 2501] A terminal RESET of the microcomputer 1 is set at Lo level for a predetermined period of time to initialize an up/down counter 20. A terminal DIR1 of the microcomputer 1 is set at Hi level to perform a count-up operation if the driving direction of the vibration wave motor is CCW. However, if the driving direction of the vibration wave motor is CW, then the terminal DIR1 of the microcomputer 1 is set at Lo level. Subsequently, a terminal CNT EN/$\overline{\text{DIS}}$ is set at Hi level to enable counting of the up/down counter 20.

[Step 2502] If the driving direction of the vibration wave motor is CCW, then a terminal DIR2 of the microcomputer 1 is set at Hi level. However, if the driving direction is CW, then the terminal DIR2 is set at Lo level.

[Step 2503] A terminal D/A OUT of the microcomputer 1 is set to have a value corresponding to an initial frequency fs.

[Step 2504] A terminal USM EN/$\overline{\text{DIS}}$ of the microcomputer 1 is set at Hi level to start driving the vibration wave motor.

[Step 2505] If the phase difference between the A- and S-electrodes detected by the phase detector 12 is smaller than a predetermined value, then the flow branches into step 2510 to stop acceleration. However, if the phase difference is the predetermined value or more, then the flow branches into step 2506 because the vibration wave motor can be further accelerated.

[Step 2506] The interval between pulses generated upon rotation of the pulse plate 13 is measured. If the pulse width is smaller than a predetermined value, then the flow branches into step 2510 to stop the acceleration. However, if the pulse width is the predetermined value or more, the flow branches into step 2507 to accelerate the vibration wave motor to a target speed.

[Step 2507] If the output from the comparator 29 is set at Lo level, and the input current to the DC/DC converter 21 is less than the comparison level, then the flow branches into step 2509 to further accelerate the vibration wave motor. However, if the output from the comparator 29 is set at Hi level, and the input current is the comparison level or more, then the flow branches into step 2508 to stop accelerating the vibration wave motor.

[Step 2508] The frequency is increased by a predetermined value to decelerate the vibration wave motor.

[Step 2509] The frequency is decreased by a predetermined value to accelerate the vibration wave motor.

[Step 2510] A count value from the up/down counter 20 is fed to an input terminal PULSE IN of the microcomputer 1. If the current position does not reach a target driving position, then the flow returns to step 2505. However, if the current position reaches the target driving position, then the flow branches to step 2511.

[Step 2511] The output terminal USM EN/$\overline{\text{DIS}}$ of the microcomputer 1 is set at Lo level to finish driving the vibration wave motor.

What is claimed is:

1. A vibration type apparatus using, as a driving force, a vibration generated upon application of a frequency signal to an electro-mechanical energy conversion element, or a system including said vibration type driving apparatus, comprising:
   a) a power supply circuit for supplying a power supply voltage to said driving apparatus;
   b) a detector for detecting a voltage level corresponding to the absolute value of a power supply voltage from said power supply circuit, said detector outputting a first signal when a detected voltage level of the absolute value of the power supply voltage is lower than a first voltage level and outputting a second signal when the power supply voltage is lower than a second voltage level, the first voltage level being higher than the second voltage level; and
   c) a control circuit, responsive to a signal from said detector, for controlling a control mode of the frequency signal, such that said control circuit changes the control mode of the frequency signal from a first mode to a second mode in response to the first signal, and changes the control mode of the frequency signal from the second mode to a third mode in response to the second signal.

2. An apparatus or system according to claim 1, wherein said control circuit shifts the frequency signal to a lower frequency in the first mode, inhibits any shift in the frequency signal to a lower frequency in the second mode, and shifts the frequency signal to a higher frequency in the third mode.

3. An apparatus or system according to claim 1, wherein said power supply circuit comprises a booster circuit for boosting a battery output, and said detector detects an output from said booster circuit.

4. An apparatus or system according to claim 2, wherein said power supply circuit comprises a booster circuit for boosting a battery output, and said detector detects an output from said booster circuit.

5. An apparatus or system according to claim 1, wherein said detector includes an A/D converter for converting the power supply voltage from said power supply circuit into a digital value.

6. An apparatus or system according to claim 2, wherein said detector includes an A/D converter for converting the power supply voltage from said power supply circuit into a digital value.

7. A vibration type driving apparatus using, as a driving force, a vibration generated upon application of a frequency signal to an electro-mechanical energy conversion element, or a system including said vibration type driving apparatus, comprising:
   a) a power supply circuit for supplying a power supply voltage to said driving apparatus;
   b) an A/D converter for converting a voltage level corresponding to the absolute value of the power supply voltage from said power supply circuit into a digital value; and
   c) a control circuit for comparing a converted digital value output by said A/D converter with a predetermined value and performing frequency control of the frequency signal in accordance with the comparison result.

8. A vibration type driving apparatus using, as a driving force, a vibration generated upon application of a frequency signal to an electro-mechanical energy conversion element, or a system including said vibration type driving apparatus, comprising:
   a) a booster circuit for boosting a battery output to obtain a power supply voltage to the apparatus;
   b) a detector for detecting a value corresponding to the absolute value of the power supply voltage output by the battery output; and
   c) a control circuit for performing frequency control of the frequency signal on the basis of a detection result of said detector.

9. An apparatus or system according to claim 8, wherein said control circuit inhibits a shift of the frequency of the frequency signal to a lower frequency when said detector determines that the battery output is less than a predetermined level.

10. A vibration type driving apparatus using, as a driving force, a vibration generated upon application of a frequency signal to an electro-mechanical energy conversion element, or a system including said vibration type driving apparatus, comprising:
    a) a booster circuit for boosting a battery output of a battery to provide a power supply voltage to the apparatus;
    b) a detector for detecting a current value corresponding to the absolute value of a current from the battery; and
    c) a control circuit for performing frequency control of the frequency signal on the basis of a detection result of said detector.

11. An apparatus or system according to claim 10, wherein said control circuit inhibits a shift of the frequency of the frequency signal to a lower frequency when said detector determines that the current is larger than a predetermined level.

12. An apparatus or system according to claim 8, wherein said control circuit shifts the frequency of the frequency signal to a lower frequency when said detector determines that the battery output is not less than a predetermined level and shifts the frequency of the frequency signal to a higher frequency when said detector determines that the battery output is less than the predetermined level.

13. An apparatus or system according to claim 10, wherein said control circuit shifts the frequency of the frequency signal to a lower frequency when said detector determines that the current is not more than a predetermined level and shifts the frequency of the frequency signal to a higher frequency when said detector determines that the current is more than the predetermined level.

* * * * *

UNITED STATES PATENT AND TRADEMARK OFFICE
CERTIFICATE OF CORRECTION

PATENT NO. : 5,495,152
DATED : February 27, 1996
INVENTOR(S) : Hajime FUKUI

It is certified that error appears in the above-indentified patent and that said Letters Patent is hereby corrected as shown below:

COLUMN 3:

Line 25, "a" (1st occurrence) should read --and outputs at terminals A and B frequency voltages having a phase--

Figure 8:
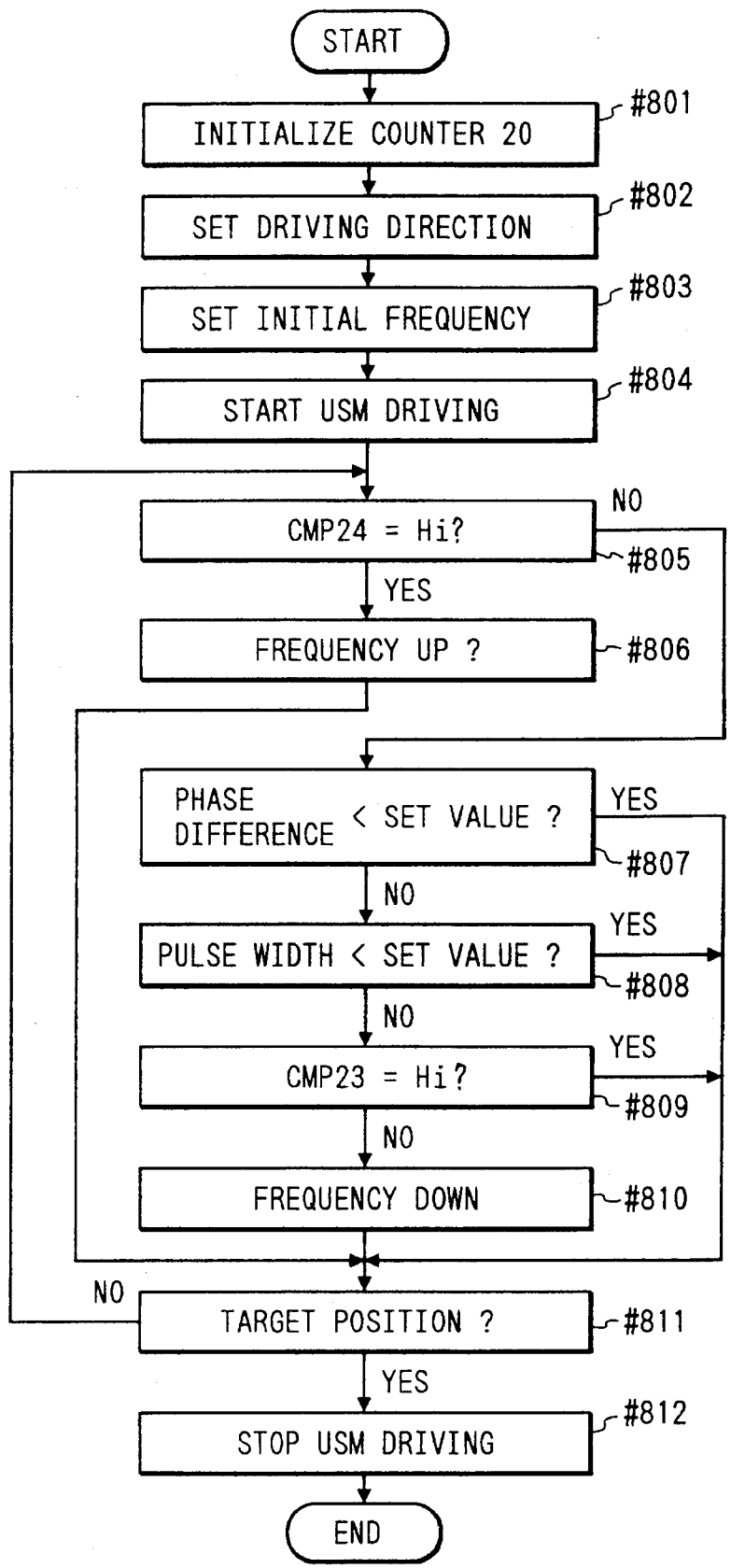
FIG. 8 is a flow chart for explaining the operation of the first embodiment.

COLUMN 6:

Line 28, "Vol" should read --Vc1--; and,
Line 41, "FIG. 8. [Step 801] should read --FIG. 8. ¶[Step 801]--.

COLUMN 7:

Line 6, "Jumps" should read --jumps--; and,
Line 49, "225" should read --25--.

COLUMN 8:

Line 22, "Vol" should read --Vc1--.

Signed and Sealed this

Thirteenth Day of August, 1996

Attest:

BRUCE LEHMAN

*Attesting Officer*    *Commissioner of Patents and Trademarks*